US008243388B2

(12) United States Patent
Shimazawa et al.

(10) Patent No.: US 8,243,388 B2
(45) Date of Patent: *Aug. 14, 2012

(54) HEAT-ASSISTED MAGNETIC HEAD CONSTITUTED OF SLIDER AND LIGHT SOURCE UNIT, AND MANUFACTURING METHOD OF THE HEAD

(75) Inventors: Koji Shimazawa, Tokyo (JP); Yasuhiro Ito, Tokyo (JP); Eiji Komura, Tokyo (JP); Seiichi Takayama, Tokyo (JP); Kosuke Tanaka, Tokyo (JP)

(73) Assignee: TDK Corporation, Tokyo (JP)

( * ) Notice: Subject to any disclaimer, the term of this patent is extended or adjusted under 35 U.S.C. 154(b) by 1147 days.

This patent is subject to a terminal disclaimer.

(21) Appl. No.: 12/107,216

(22) Filed: Apr. 22, 2008

(65) Prior Publication Data
US 2009/0262448 A1 Oct. 22, 2009

(51) Int. Cl.
*G11B 5/127* (2006.01)
*G11B 11/00* (2006.01)

(52) U.S. Cl. ................. 360/125.74; 369/13.33
(58) Field of Classification Search .............. 360/125.74
See application file for complete search history.

(56) References Cited

U.S. PATENT DOCUMENTS

| 7,804,655 | B2 | 9/2010 | Shimazawa et al. | |
| 7,957,085 | B2 * | 6/2011 | Tanaka et al. | 360/59 |
| 8,065,786 | B2 * | 11/2011 | Shimazawa et al. | 29/603.12 |
| 2006/0187564 | A1 | 8/2006 | Sato et al. | |
| 2007/0139818 | A1 | 6/2007 | Shimazawa et al. | |
| 2007/0177302 | A1 | 8/2007 | Shimazawa et al. | |
| 2009/0266789 | A1 | 10/2009 | Shimazawa et al. | |
| 2011/0242697 | A1 | 10/2011 | Mori et al. | |

FOREIGN PATENT DOCUMENTS

| JP | A-8-102014 | 4/1996 |
| JP | A-10-162444 | 6/1998 |
| JP | A-2001-255254 | 9/2001 |
| JP | A-2004-158067 | 6/2004 |
| JP | A-2008-10093 | 1/2008 |
| JP | A-2008-47268 | 2/2008 |

OTHER PUBLICATIONS

Dec. 1, 2010 Office Action issued in U.S. Appl. No. 12/246,216.
Miyanishi et al., "Near-Field Assisted Magnetic Recording," *IEEE Transactions on Magnetics*, vol. 41, No. 10, Oct. 2005, pp. 2817-2821.
Oct. 17, 2011 Office Action issued in U.S. Appl. No. 12/728,510.

* cited by examiner

*Primary Examiner* — David D Davis
(74) *Attorney, Agent, or Firm* — Oliff & Berridge, PLC

(57) ABSTRACT

Provided is a heat-assisted magnetic recording head constituted of a light source unit and a slider, which can be easily joined to each other with sufficiently high accuracy of joining position. The slider comprises a head part including a waveguide having an incident center on its end. The surface including an emission center of the light source is protruded from a joining surface of the unit substrate. And a step is provided on an end surface of the head part. The protruded portion of a lower surface of the light source has a surface contact with a wall surface of the step. Further, the distance between the wall surface of the step and the incident center of the waveguide is set to be equal to the distance between the emission center of the light source and the protruded portion of the lower surface of the light source.

21 Claims, 14 Drawing Sheets

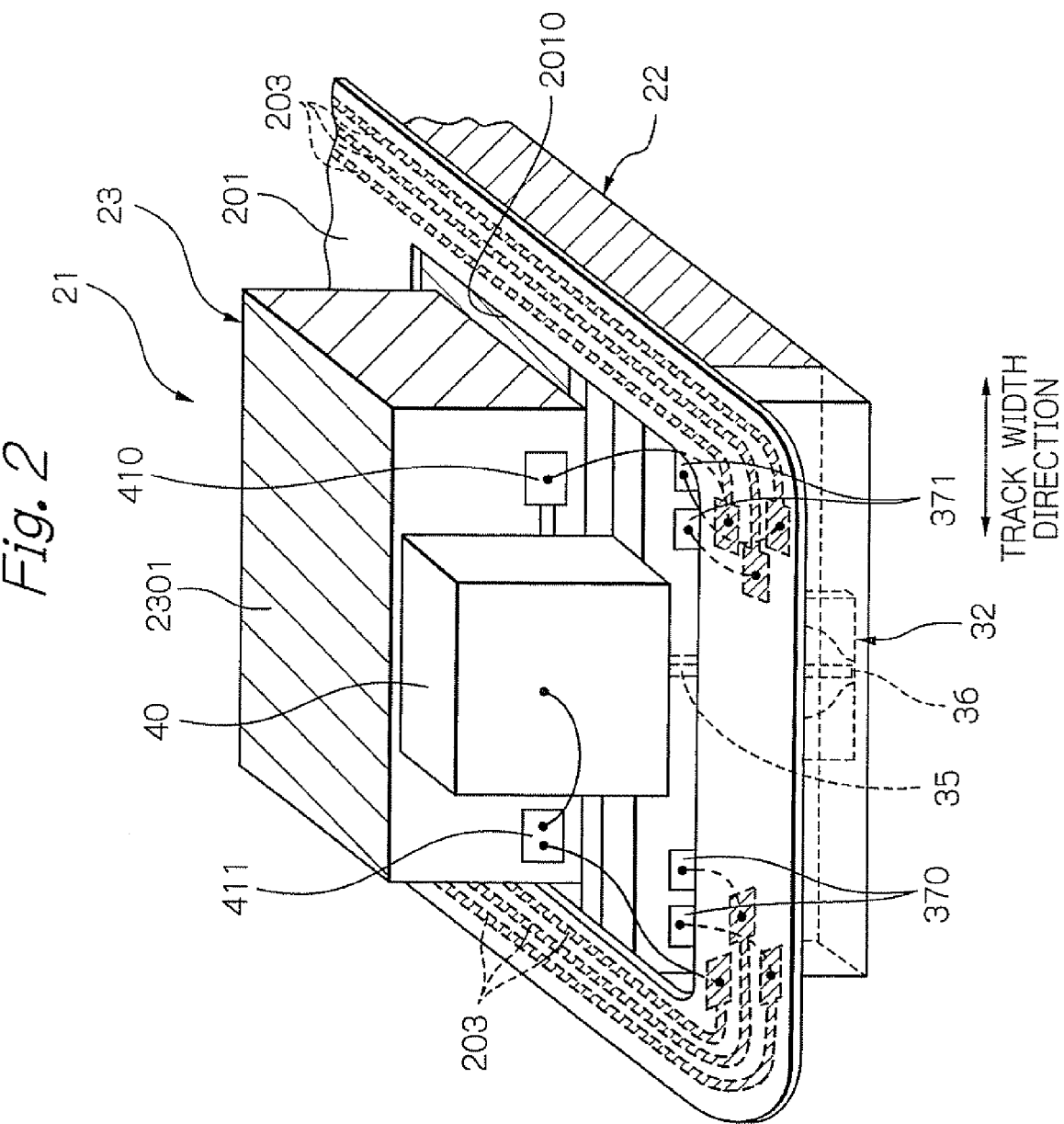

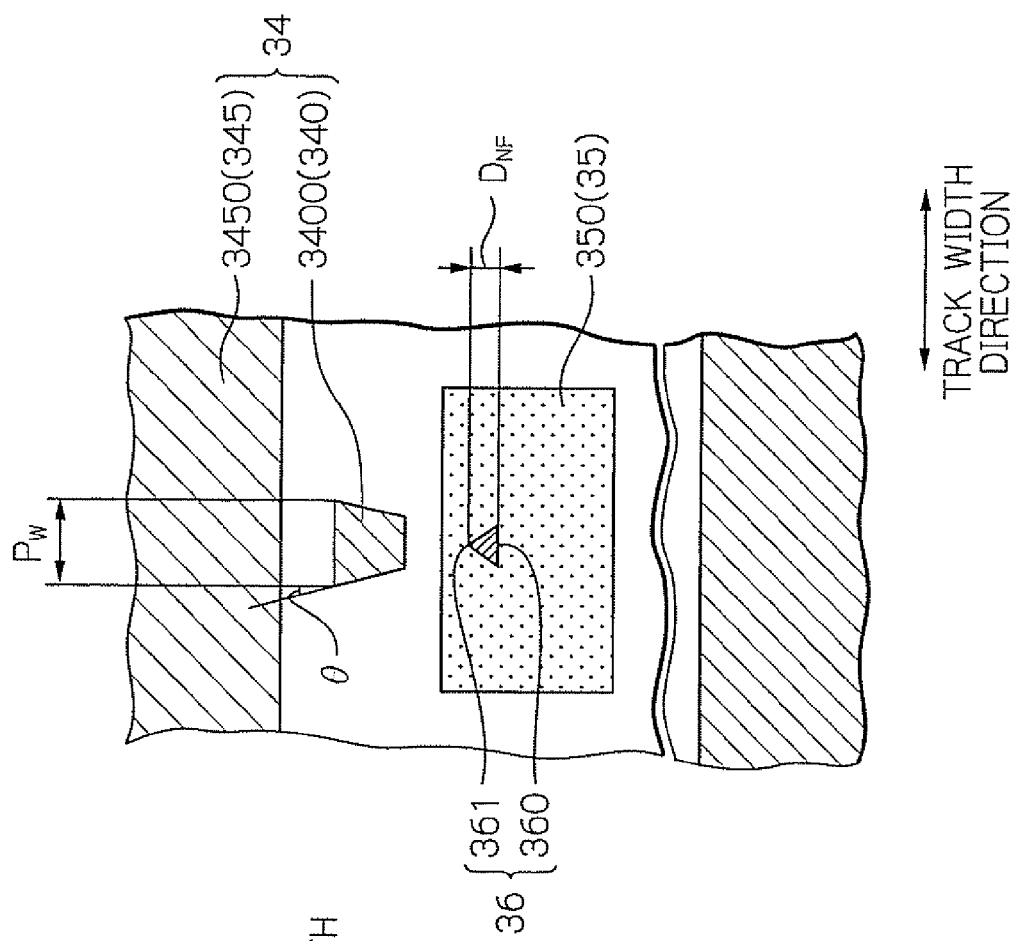
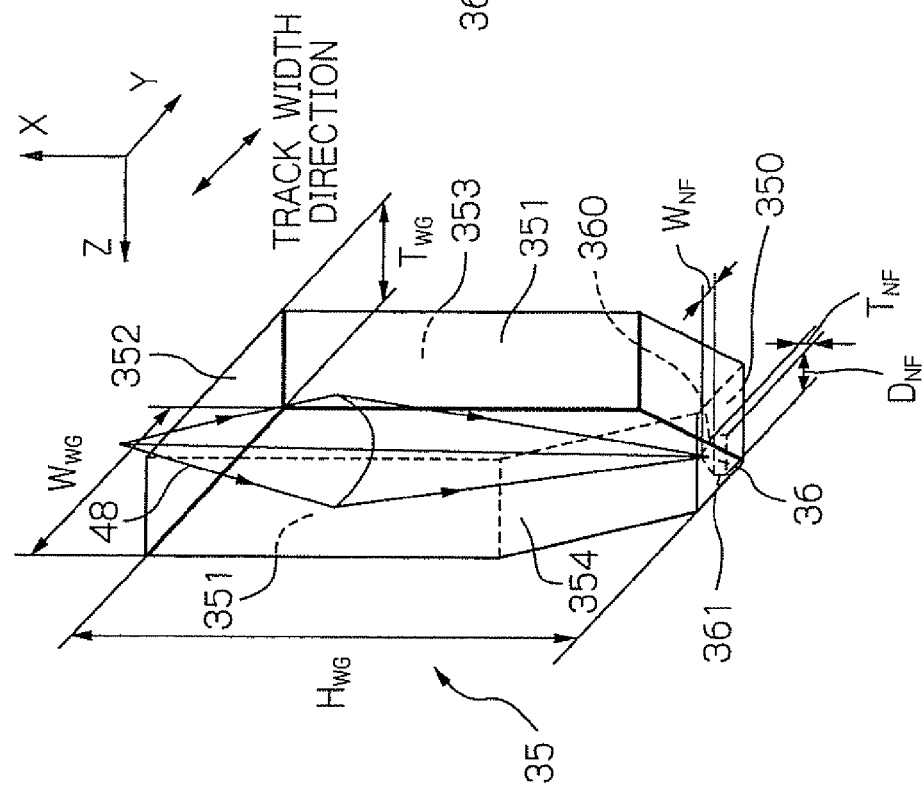

HEAT-ASSISTED MAGNETIC HEAD CONSTITUTED OF SLIDER AND LIGHT SOURCE UNIT, AND MANUFACTURING METHOD OF THE HEAD

BACKGROUND OF THE INVENTION

1. Field of the Invention

The present invention relates to a magnetic head for writing data signals according to a heat-assisted magnetic recording technique, and to a slider and a unit having a light source both of which constitute the magnetic head. The present invention further relates to a method for manufacturing the magnetic head.

2. Description of the Related Art

In a magnetic disk drive apparatus intended for higher recording density, a thin-film magnetic head within it needs to be further improved in its performance. As such a thin-film magnetic head, a composite-type thin-film magnetic head is widely used, which has a stacked structure of a magnetoresistive (MR) element for reading data signals and an electromagnetic transducer for writing data signals.

Generally, a magnetic recording medium is magnetically discontinuous, in which magnetic microparticles are gathered together. Usually, each of the magnetic microparticles has a single magnetic-domain structure; and in the medium, one record bit consists of a plurality of the magnetic microparticles. Therefore, for improving its recording density, irregularity in the boundary of the record bit is required to be reduced by decreasing the size (volume) of the magnetic microparticle. However, a problem is likely to occur that the decrease in size causes thermal stability of the magnetization of the record bit to be degraded.

As a measure against the thermal stability problem, it may be possible to increase the magnetic anisotropy energy $K_U$ of the magnetic microparticles. However, the increase in energy $K_U$ causes the increase in coercive force of the magnetic recording medium. Whereas, write field intensity of the thin-film magnetic head is limited by the amount of saturation magnetic flux density of the soft-magnetic pole material of which the magnetic core of the head is formed. Therefore, the head cannot write data to the magnetic recording medium when the coercive force of the medium exceeds the write field limit.

Currently, as a method for solving the thermal stability problem, a heat-assisted magnetic recording technique is proposed, in which a magnetic head writes data to the magnetic recording medium formed of a material with large magnetic anisotropy energy $K_U$, by reducing the coercive force of the medium with heat supplied to the medium just before the write field is applied. The heat-assisted magnetic recording technique has some similarity to a magneto-optic recording technique. However in the heat-assisted magnetic recording technique, the area of applied magnetic field determines spatial resolution of record bits (that is, magnetic-field-dominant technique). Whereas, in the magneto-optic recording technique, the area of emitted light determines spatial resolution of record bits (that is, light-dominant technique).

As proposed heat-assisted magnetic recording techniques, Japanese patent Publication No. 2001-255254A describes a near-field light probe for irradiating light to the recording medium, which has a metal scatterer with strobilus shape formed on a substrate and a dielectric material film formed around the metal scatterer. And Japanese patent Publication No. 10-162444A describes a head with a solid immersion lens provided within a recording and reproducing apparatus. Further, Japanese patent Publication No. 2004-158067A describes a scatterer as a near-field light probe, which is formed in contact with the main magnetic pole of a single-pole-type head for perpendicular magnetic recording in such a way that the irradiated surface of the scatterer is perpendicular to the medium surface. Furthermore, Miyanishi et al. "Near-field Assisted Magnetic Recording" IEEE TRANSACTIONS ON MAGNETICS, Vol. 41, No. 10, p. 2817-2821 (2005) describes a U-shaped near-field light probe formed on a quartz crystal slider.

Further, U.S. Patent Publication No. 2007/0139818 A1 discloses a thin-film magnetic head having an optic fiber as a means for supplying light from an outside light source. And Japanese Patent Publication No. 2008-10093A discloses a thin-film magnetic head in which a light source is provided on the end surface opposite to the medium-opposed surface of a slider substrate; and the light generated from the light source is directed toward the medium-opposed surface by using a changing-light-path element. Further, U.S. Patent Publication No. 2006/0187564 A1 describes a magnetic head in which a laser diode is attached on the element-integration surface of a slider so that light can reach the incident end face of a light waveguide.

As described above, various forms of heat-assisted magnetic recording techniques are proposed. However, the present inventors suggest a heat-assisted magnetic recording head constituted by joining a light source unit provided with a light source to the end surface (back surface) opposite to the medium-opposed surface of a slider provided with a write head element. For example, Japanese Patent Application No. 2008-047268A discloses such a light source unit. The advantages of the above-described heat-assisted magnetic recording head are as follows:

a) The head has an affinity with the conventional manufacturing method of thin-film magnetic heads because the medium-opposed surface and the element-integration surface are perpendicular to each other in the slider.

b) The light source can avoid suffering mechanical shock directly during operation because the light source is provided far from the medium-opposed surface.

c) The light source such as a laser diode and the head elements can be evaluated independently of each other; thus the degradation of manufacturing yield for obtaining the whole head can be avoided. Whereas, in the case that all the light source and head elements are provided within the slider, the manufacturing yield rate for obtaining the whole head is likely to decrease significantly due to the multiplication of the process yield for the light-source and the process yield for the head elements.

d) The head can be manufactured with reduced man-hour and at low cost, because of no need to provide the head with optical components such as a lens or prism which are required to have much high accuracy, or optical elements having a special structure for connecting optical fibers or the like.

However, in the manufacturing process of the heat-assisted magnetic recording head described above, accuracy of the joining position of the light source unit when joining the unit to the back surface of the slider is required to be significantly high. Actually, the present inventors adopt a structure in which a waveguide is provided within the slider for guiding the light generated by the light source to the medium-opposed surface. When joining the light source unit to this slider, the emission center of the light source needs to be fitted to the incident center of the waveguide, which is positioned on the back surface of the slider. This positioning (fitting) corresponds to the alignment of optical axis in two directions (Y-axis and Z-axis directions) in the back surface of the slider, which is considerably difficult to be performed. As a result, a problem that mass-production efficiency of the head is significantly degraded may be likely to occur.

BRIEF SUMMARY OF THE INVENTION

Therefore, an object of the present invention is to provide: a light source unit and a slider, which can be easily joined to each other with sufficiently high accuracy of joining position; and a heat-assisted magnetic recording head that is constituted of the light source unit and the slider.

Another object of the present invention is to provide a manufacturing method of the heat-assisted magnetic recording head, in which the light source can be easily joined to the slider with sufficiently high accuracy of joining position.

Before describing the present invention, terms used herein will be defined. In a multilayer structure or an element formed on/above the element-integration surface of a slider substrate of the slider, or in a multilayer structure or an element formed on/above the source-installation surface of a unit substrate of the light source unit, the substrate side, when viewing from a standard layer or element, is referred to as being "lower" side with respect to the standard layer or element; and the side opposite to the substrate, when viewing from a standard layer or element, is referred to as being "upper" side with respect to the standard layer or element. Further, a portion on the substrate side of a layer or element is referred to as being "lower" portion; and a portion on the side opposite to the substrate is referred to as being "upper" portion.

Further, in some figures showing embodiments of the magnetic head according to the present invention, "X-axis direction", "Y-axis direction" and "Z-axis direction" are defined according to need. The end surface opposite to the medium-opposed surface of the slider is referred to as being "back surface" of the slider. And the direction perpendicular to the medium-opposed surface of the slider (X-axis direction) is referred to as being "height direction".

According to the present invention, a slider for heat-assisted magnetic recording is provided, the slider and a light source unit constituting a heat-assisted magnetic recording head. The light source unit is joined to an end surface opposite to a medium-opposed surface of the slider, and the light source unit includes: a light source provided on a source-installation surface of a unit substrate; and a surface including an emission center of the light source, and protruded from a joining surface perpendicular to the source-installation surface of the unit substrate. The slider comprises:

a slider substrate; and a head part formed on an element-integration surface perpendicular to the medium-opposed surface of the slider substrate, and including: a write head element for writing data to a magnetic recording medium; and a waveguide having an incident center on its end opposite to the medium-opposed surface, for guiding an entering light to the medium-opposed-surface side, a step being provided on an end surface opposite to the medium-opposed surface of the head part, said step formed so that a portion on the slider-substrate side of the end surface of the head part becomes higher, and a distance between a wall surface of the step and the incident center of the waveguide being set to be equal to a distance between the emission center of the light source and a portion of a lower surface of the light source, the portion being protruded from the unit substrate.

When the above-described light source unit is joined to the above-described slider according to the present invention, at least positional alignment in the direction perpendicular to the element-integration surface of the slider substrate (in Z-axis direction) can be easily completed which sufficiently high accuracy.

In the slider according to the present invention, it is preferable that: at least a portion of the wall surface of the step is a portion of an upper surface of at least one stopper layer formed above the element-integration surface of the slider substrate; and a distance between the upper surface and the incident center of the waveguide is set to be equal to a distance between the emission center of the light source and a portion of a lower surface of the light source, the portion being protruded from the unit substrate. The distance between the upper surface of at least one stopper layer and the incident center of the waveguide can be set with very small error by using thin-film processes. As a result, the position of the incident center can be fitted with the position of the emission center with high accuracy. Further, the incident center is preferably positioned at a midpoint, in a direction perpendicular to the element-integration surface, of the end of the waveguide opposite to the medium-opposed surface. Furthermore, the slider according to the present invention preferably further comprises a near-field light generating element for generating near-field light used for heat-assist, on an end portion on the medium-opposed surface side of the waveguide, one end of the near-field light generating element extending to the medium-opposed surface.

According to the present invention, a light source unit for heat-assisted magnetic recording is further provided, the light source unit and a slider constituting a heat-assisted magnetic recording head, and the light source unit being joined to the slider. The slider includes: a head part formed on an element-integration surface perpendicular to a medium-opposed surface of a slider substrate; and a step provided on an end surface opposite to a medium-opposed surface of the head part, the step formed so that a portion on the slider-substrate side of the end surface of the head part becomes higher. The light source unit comprises a unit substrate and a light source provided on a source-installation surface of the unit substrate, a surface including an emission center of the light source being protruded from a joining surface perpendicular to the source-installation surface of the unit substrate, and a distance between the emission center of the light source and a portion of a lower surface of the light source, which is protruded from the unit substrate, being set to be a predetermined value.

In the light source unit according to the present invention, the light source is preferably a laser diode, and the emission center is preferably positioned at a midpoint, in a direction perpendicular to the source-installation surface, of an active layer of the laser diode. And The above-described predetermined value is preferably in the range from 2 micrometers to 10 micrometers.

According to the present invention, a heat-assisted magnetic recording head is further provided, the heat-assisted magnetic recording head constituted of a slider and a light source unit, and the light source unit being joined to the slider. The light source unit comprises a unit substrate and a light source provided on a source-installation surface of the unit substrate. The slider comprises:

a slider substrate; and a head part formed on an element-integration surface perpendicular to the medium-opposed surface of the slider substrate, and including: a write head element for writing data to a magnetic recording medium; and a waveguide having an incident center on its end opposite to the medium-opposed surface, for guiding an entering light to the medium-opposed-surface side, a surface including an emission center of the light source being protruded from a joining surface perpendicular to the source-installation surface of the unit substrate, a step being provided on an end surface opposite to the medium-opposed surface of the head part, the step formed so that a portion on the slider-substrate side of the end surface of the head part becomes higher, the joining surface of the unit substrate having a surface contact with the portion on the slider-substrate side of the end surface of the head part, and a portion of a lower surface of the light source, which is protruded from the unit substrate, having a surface contact with a wall surface of the step, and a distance between the wall surface of the step and the incident center of the waveguide being set to be equal to a distance between the emission center of the light source and the protruded portion of the lower surface of the light source.

According to the present invention, a head gimbal assembly (HGA) is further provided, which comprises: a suspension; and the above-described heat-assisted magnetic recording head provided on the suspension, constituted of a slider and a light source unit, and the light source unit being joined to the slider. In the HGA, an end surface opposite to the medium-opposed surface of the slider substrate is adhered to the suspension. The suspension comprises a aperture, and the light source unit is protruded from the aperture on a side opposite to the slider in relation to the suspension.

According to the present invention, a magnetic recording apparatus is further provided, which comprises: at least one HGA described above; at least one magnetic recording medium; and a recording circuit for controlling read and write operations of said heat-assisted magnetic recording head, the operations performed to the at least one magnetic recording medium. And the recording circuit further comprises a light-emitting control circuit for controlling light-emitting operation of the light source.

According to the present invention, a manufacturing method of a heat-assisted magnetic recording head is further provided, in which a light source unit is joined to a slider, the light source unit comprising a unit substrate and a light source provided on a source-installation surface of the unit substrate, and the slider comprising:

a slider substrate; and a head part formed on an element-integration surface perpendicular to the medium-opposed surface of the slider substrate, and including: a write head element for writing data to a magnetic recording medium; and a waveguide having an incident center on its end opposite to the medium-opposed surface, for guiding an entering light to the medium-opposed-surface side.

The manufacturing method comprises the steps of:

fixing the light source on the source-installation surface of the unit substrate so that a surface including an emission center of the light source is protruded from a joining surface perpendicular to the source-installation surface of the unit substrate;

providing a step on an end surface opposite to the medium-opposed surface of the head part, in which a portion on the slider-substrate side of the end surface of the head part becomes higher, so that a distance between a wall surface of the step and the incident center of the waveguide is set to be equal to a distance between the emission center of the light source and a portion of a lower surface of the light source, the portion protruded from the unit substrate; and while bringing the joining surface of the unit substrate into a surface contact with the portion on the slider-substrate side of the end surface of the head part, bringing the protruded portion of the lower surface of the light source into a surface contact with the wall surface of the step.

In the manufacturing method according to the present invention, the light source unit can be joined to the slider with sufficiently high positional accuracy. Especially, the distance between the wall surface of the step and the incident center of the waveguide and the distance between the emission center of the light source and the portion of the lower surface of the light source, the portion protruded from the unit substrate, can be set to be predetermined values with very small errors by using thin-film processes. Therefore, the position of the emission center of the laser diode can be reliably aligned with high accuracy to the position of the incident center of the waveguide. Further, at least positional alignment in the direction perpendicular to the element-integration surface of the slider substrate (in Z-axis direction) can be easily completed in a mechanical manner, which excellently facilitates the joining; and thus contributes to the improvement in mass-production efficiency of the heat-assisted magnetic recording head.

In the manufacturing method according to the present invention, it is preferable that the process of providing said step further comprising the steps of:

forming at least one stopper layer above the element-integration surface of the slider substrate;

forming the waveguide so that a distance between an upper surface of the at least one stopper layer and the incident center of the waveguide is equal to a distance between the emission center of the light source and the protruded portion of the lower surface of the light source; and providing the step in which a portion of the wall surface is a portion of the upper surface of the at least one stopper layer, on an end surface opposite to the medium-opposed surface of the head part, by performing etching process on the end surface of the head part and performing cutting process to obtain individual sliders. The distance between the upper surface of at least one stopper layer and the incident center of the waveguide can be set with very small error by using thin-film processes. As a result, the position of the incident center can be fitted with the position of the emission center with high accuracy.

Further, in the case of using the stopper layer, it is more preferable that: after forming said waveguide, at least one additional stopper layer is formed above the waveguide. Here, an end opposite to the medium-opposed surface of at least one additional stopper layer determines a position of the incident center of the waveguide in a direction perpendicular to the medium-opposed surface of the head part; then, the above-described etching process is performed. Providing the additional stopper layer enables the end surface including the incident center of the waveguide to be almost perpendicular to the element-integration surface of the slider substrate.

Further, in the manufacturing method according to the present invention, the incident center is preferably set to be positioned at a midpoint, in a direction perpendicular to the element-integration surface, of the end of the waveguide opposite to the medium-opposed surface. And it is also preferable that: a laser diode is used as the light source; and the emission center is set to be positioned at a midpoint, in a direction perpendicular to the source-installation surface, of an active layer of the laser diode. Further, the distance between the emission center of the light source and the portion of the lower surface of the light source, the portion being protruded from the unit substrate, is preferably set to be in the range from 2 micrometers to 10 micrometers.

Further objects and advantages of the present invention will be apparent from the following description of preferred embodiments of the invention as illustrated in the accompanying figures. In each figure, the same element as an element shown in other figure is indicated by the same reference numeral. Further, the ratio of dimensions within an element and between elements becomes arbitrary for viewability.

BRIEF DESCRIPTION OF THE SEVERAL VIEWS OF THE DRAWINGS

FIG. 2 shows a perspective view schematically illustrating an embodiment in which the heat-assisted magnetic recording head is attached on the flexure;

FIG. 3b shows a perspective view illustrating one embodiment of the waveguide and near-field light generating element;

FIG. 3c shows a plain view illustrating the shapes on the head-part end surface of the ends of electromagnetic transducer, the waveguide and the near-field light generating element;

DETAILED DESCRIPTION OF THE INVENTION

Figure 1:
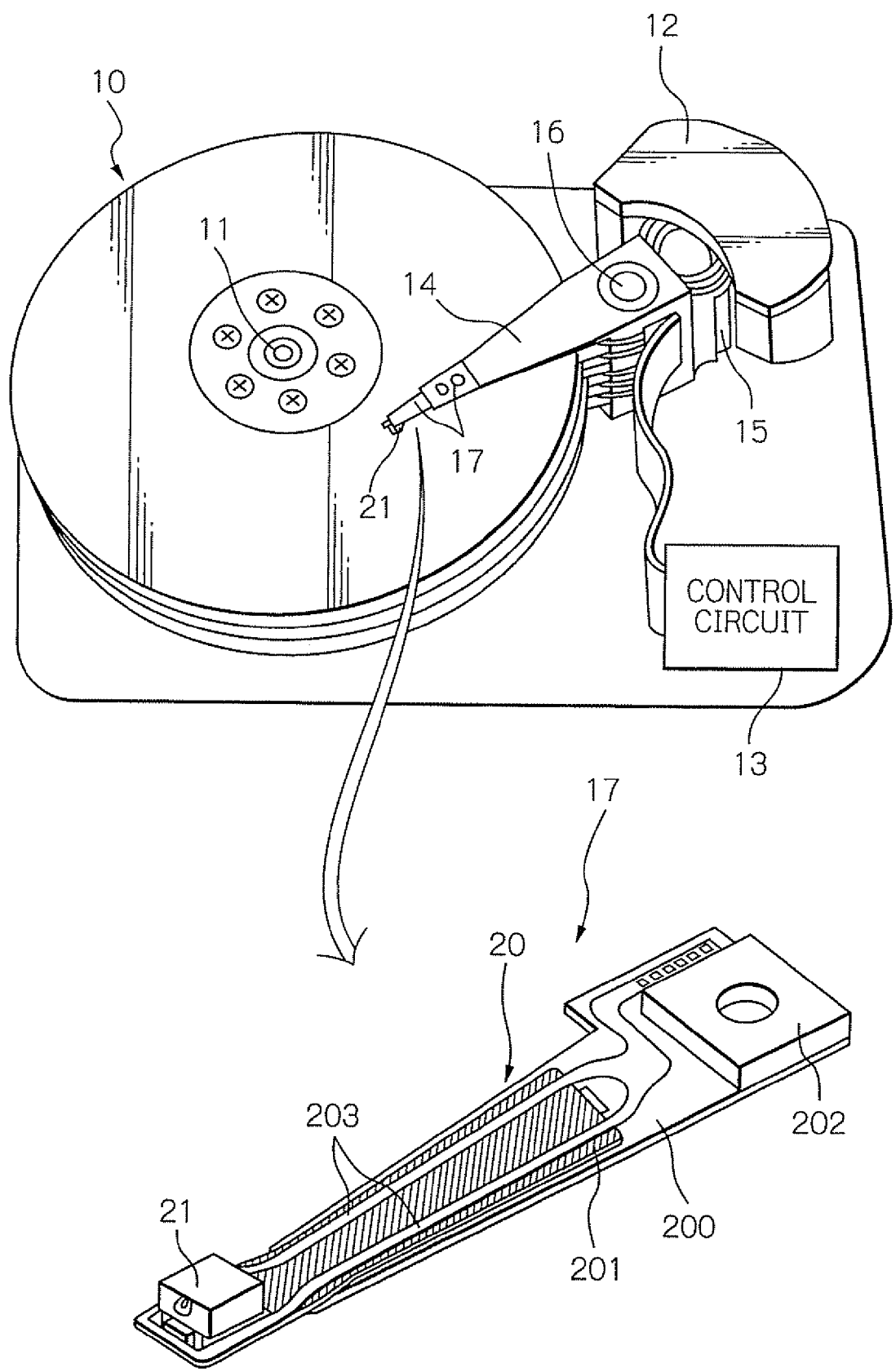
FIG. 1 shows perspective views schematically illustrating main configurations of one embodiments of a magnetic disk drive apparatus and an HGA according to the present invention.

FIG. 1 shows perspective views schematically illustrating main configurations of one embodiments of a magnetic disk drive apparatus and an HGA according to the present invention. In the perspective view of the HGA, the side opposed to the surface of a magnetic disk is turned upward.
(Magnetic Disk Drive Apparatus and HGA)

A magnetic disk drive apparatus shown in FIG. 1, as a magnetic recording apparatus, includes: multiple magnetic disks 10 as magnetic recording media which rotate about a spindle of a spindle motor 11; an assembly carriage device 12 provided with multiple drive arms 14; HGAs (head gimbal assemblies) 17 each of which is attached on the end portion of each drive arm 14 and is provided with a heat-assisted magnetic recording head 21; and a recording/reproducing and light-emitting control circuit 13 for controlling read/write operations of the head 21 and controlling light-emitting operation of a laser diode as a light source that generates laser light used for a heat-assisted magnetic recording described later.

The assembly carriage device 12 is provided for positioning the heat-assisted magnetic recording head 21 above a track formed on the magnetic disk 10, in which record bits are aligned. In the device 12, the drive arms 14 are stacked along a pivot bearing axis 16 and are capable of angular-pivoting about the axis 16 driven by a voice coil motor (VCM) 15. The structure of the magnetic disk drive apparatus according to the present invention is not limited to the above-described one. The number of each of magnetic disks 10, drive arms 14, HGAs 17, and heads 21 may be a single.

Also as shown in FIG. 1, in the HGA 17, a suspension 20 includes: a load beam 200; a flexure 201 with elasticity which is fixed on the load beam 200; a base plate 202 provided on the base portion of the load beam 200; and a wiring member 203 provided on the flexure 201, which consists of lead conductors and connection pads electrically connected to both ends of the lead conductors. The heat-assisted magnetic recording head 21 is fixed and supported on the flexure 201, or on the end portion of the suspension 20, in such a way to face the surface of each magnetic disk 10 with a predetermined spacing (flying height). Further, one end of the wiring member 203 is electrically connected to terminal electrodes of the heat-assisted magnetic recording head 21.

The structure of the suspension 20 is also not limited to the above-described one. A head drive IC chip may be attached at some midpoint of the suspension 20.

FIG. 2 shows a perspective view schematically illustrating an embodiment in which the heat-assisted magnetic recording head 21 is attached on the flexure 201. In the perspective view, the side of the head 21 opposed to the surface of the magnetic disk is turned downward.

As shown in FIG. 2, the heat-assisted magnetic recording head 21 is constituted by joining a light source unit 23 having a laser diode 40 as a light source to a slider 22 which includes: a head element 32 for writing and reading data; a waveguide 35 for guiding laser light generated from the laser diode 40 to the medium-opposed surface (opposed-to-medium surface); and a near-field light generating element 36 for generating near-field light by receiving the laser light. The flexure 201 has an aperture 2010; the light source unit 23 protrudes from the aperture 2010 on the side opposite to the slider 22 in relation to the flexure 201. Adhered to the flexure 201 is a portion of the end surface opposite to the medium-opposed surface of the slider 22, on which the light source unit 23 does not exist.

Further, the slider 22 includes a pair of terminal electrodes 370 and a pair of terminal electrodes 371, which are for the head element 32. These terminal electrodes 370 and 371 are electrically connected to the connection pads of the wiring member 203 provided on the flexure 201. Further, the light source unit 23 includes two terminal electrodes 410 and 411, which are also electrically connected to the connection pads of the wiring member 203 provided on the flexure 201.

The embodiment of the heat-assisted magnetic recording head 21 fixed to the flexure 201 is not limited to the above-described one. Adhered to the flexure 201 may be the end surface 3201 of the light source unit 23, opposite to the slider 22. In this case, the aperture 2010 is unnecessary in the flexure 201.

Figure 3A:
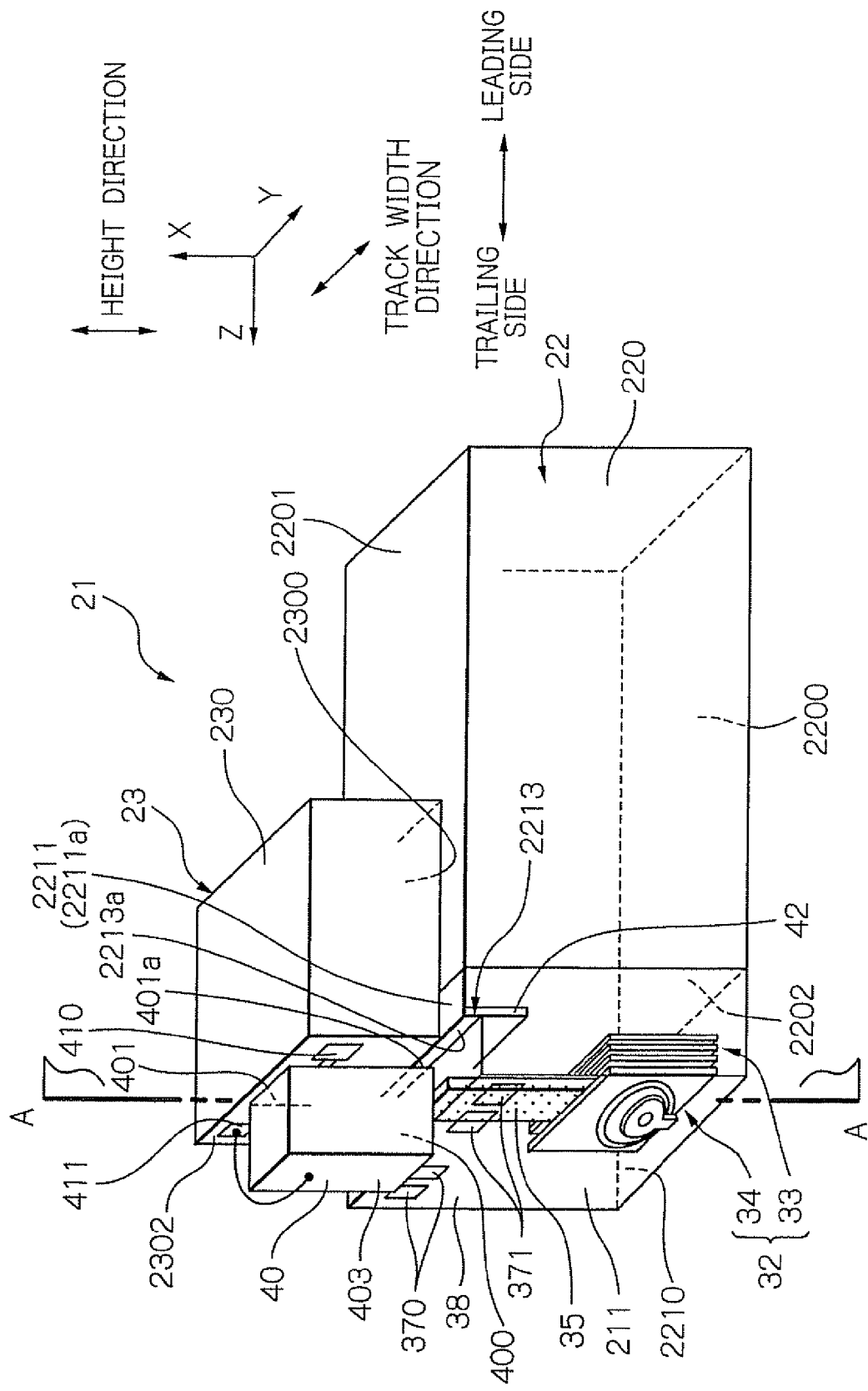
FIG. 3a shows a perspective view illustrating one embodiment of the heat-assisted magnetic recording head according to the present invention.

FIG. 3a shows a perspective view illustrating one embodiment of the heat-assisted magnetic recording head according to the present invention. FIG. 3b shows a perspective view illustrating one embodiment of the waveguide 35 and near-field light generating element 36. Further, FIG. 3c shows a plain view illustrating the shapes on the head-part end surface 2210 of the ends of electromagnetic transducer 34, the waveguide 35 and the near-field light generating element 36.

(Heat-Assisted Magnetic Recording Head)

As shown in FIG. 3a, the heat-assisted magnetic recording head 21 includes the slider 22 and the light source unit 23, as described above. The slider 22 includes: a slider substrate 220 having an air bearing surface (ABS) 2200 processed so as to provide an appropriate flying height, and formed of, for example, AlTiC ($Al_2O_3$—TiC); and a head part 221 formed on an element-integration surface 2202 perpendicular to the ABS 2200. While, the light source unit 23 includes: a unit substrate 230 having an joining surface 2300, and formed of, for example, AlTiC ($Al_2O_3$—TiC); and a laser diode 40 as a light source provided on a source-installation surface 2302 perpendicular to the joining surface 2300. The slider 22 and the light source unit 23 are adhered to each other so that the back surface 2201 of the slider substrate 220 and the joining surface 2300 of the unit substrate 230 have a surface contact with each other. Here, the back surface 2201 of the slider substrate 220 is defined as an end surface opposite to the ABS 2200 of the slider substrate 220.

(Slider)

In the slider 22, the head part 221 formed on the element-integration surface 2202 of the slider substrate 220 includes: a head element 32 constituted of a magnetoresistive (MR) element 33 for reading data from the magnetic disk and an electromagnetic transducer 34 for writing data to the magnetic disk; a waveguide 35 provided through between the MR element 33 and the electromagnetic transducer 34; a near-field light generating element 36 for generating near-field light to heat a portion of the magnetic record layer of the magnetic disk; an overcoat layer 38 formed on the element-integration surface 2202, so as to cover the MR element 33, the electromagnetic transducer 34, the waveguide 35 and the near-field light generating element 36; a pair of terminal electrodes 370 exposed in the upper surface of the overcoat layer 38, and electrically connected to the MR element 33; a pair of terminal electrodes 371 also exposed in the upper surface of the overcoat layer 38, and electrically connected to the electromagnetic transducer 34; and a stopper layer 42, one end of which reaches the head-part end surface 2211 opposite to the ABS 2200 of the head part 221.

Further, provided is a step 2213 on the head-part end surface 2211 opposite to the ABS 2200 of the head part 221, in which a portion on the slider substrate 220 side of the head-part end surface 2211 becomes higher. Here, the wall surface 2213a of the step 2213 is a portion of the upper surface of the stopper layer 42. Providing this step 2213 in a predetermined position enables the light source unit 23 to be easily joined to the slider 22 with high accuracy, as described later in detail.

One ends of the MR element 33, the electromagnetic transducer 34 and the near-field light generating element 36 reach the head-part end surface 2210 of the head part 221, which is a portion of medium-opposed surface. Here, the head-part end surface 2210 and the ABS 2200 constitute the whole medium-opposed surface of the heat-assisted magnetic recording head 21. During actual write and read operations, the heat-assisted magnetic recording head 21 aeromechanically flies above the surface of the rotating magnetic disk with a predetermined flying height. Thus, the ends of the MR element 33 and electromagnetic transducer 34 face the surface of the magnetic record layer of the magnetic disk with a appropriate magnetic spacing. Then, MR element 33 reads data by sensing signal magnetic field from the magnetic record layer, and the electromagnetic transducer 34 writes data by applying signal magnetic field to the magnetic record layer. When writing data, laser light, which is generated from the laser diode 40 of the light source unit 23 and propagates through the waveguide 35, is irradiated onto the near-field light generating element 36. The irradiation causes near-field light to be generated from the end of the near-field light generating element 36, extending to the head-part end surface 2210. The generated near-field light reaches the surface of the magnetic disk, and heats a portion of the magnetic record layer of the magnetic disk. As a result, the coercive force of the portion is decreased to a value that enables writing; thus the heat-assisted magnetic recording can be accomplished.

The waveguide 35 is positioned, as shown in FIG. 3a, parallel to the element-integration surface 2202 and between the MR element 33 and the electromagnetic transducer 34. And the waveguide 35 extends from its end surface 350 on the head-part end surface 2210 to the opposite end surface 352 on the head-part end surface 2211. The waveguide 35 may have a rectangular parallelepiped shape, or may have a portion on the head-part end surface 2210 side, which tapers in the track width direction (Y-axis direction), as shown in FIG. 3a. The width $W_{WG}$ in the track width direction (Y-axis direction) of the waveguide 35 may be, for example, in the range approximately from 1 to 200 μm (micrometers), and the thickness $T_{WG}$ (in Z-axis direction) may be, for example, in the range approximately from 2 to 10 μm, and the height $H_{WG}$ (in X-axis direction) may be, for example, in the range approximately from 10 to 300 μm.

Further, as shown in FIG. 3b, both the side surfaces 351, the lower surface 353 and the upper surface 354 of the waveguide 35 have a contact with the overcoat layer 38 (FIG. 3a). The waveguide 35 is formed of a dielectric material with refractive index n higher than that of the constituent material of the overcoat layer 38, made by using, for example, a sputtering method. For example, in the case that the overcoat layer 38 is formed of $SiO_2$ (n=1.5), the waveguide 35 can be formed of, for example, $Al_2O_3$ (n=1.63). Further, in the case that the overcoat layer 38 is formed of $Al_2O_3$ (n=1.63), the waveguide 35 can be formed of, for example, $SiO_xO_Y$ (n=1.7-1.85), $Ta_2O_5$ (n=2.16), $Nb_2O_5$ (n=2.33), TiO (n=2.3-2.55) or $TiO_2$ (n=2.3-2.55). This material structure of the waveguide 35 not only enables the propagation loss of laser light to be reduced due to the excellent optical characteristics of the constituent material, but also provides the total reflection in both the side surfaces 351, the lower surface 353 and the upper surface 354 due to the existence of the overcoat layer 38 as a clad. As a result, more amount of laser light can reach the near-field light generating element 36, which improves the efficiency of generating the near-field light.

As shown in FIGS. 3b and 3c, the near-field light generating element 36 is a plate-like member provided on the end surface 350 of the waveguide 35, one end surface of which reaches the head-part end surface 2210. In the present embodiment, when viewing from the head-part end surface 2210 side (as shown in FIG. 3c), the near-field light generating element 36 has a triangular shape with a bottom edge 360 extending in the track width direction and an apex 361 positioned on the electromagnetic transducer 34 side of the bottom edge 360 (on the trailing side). The triangular shape is preferably an isosceles triangle in which base angles in both ends of the bottom edge 360 are equal. The apex 61 is positioned so as to be opposed to the edge on the leading side of the main magnetic pole layer 340 of the electromagnetic transducer 34 described later. The main magnetic pole layer 340 has, when viewing from the head-part end surface 2210 side (as shown in FIG. 3c), a trapezoidal shape with longer edge on the trailing side. That is, the apex 61 is positioned near the edge on the leading side of the main magnetic pole layer 340.

Under the above-described configuration on the head-part end surface 2210, irradiating laser light 48 to the near-field light generating element 36 causes near-field light to be generated mainly from the apex 361 due to the concentration of electric field in the vicinity of the apex 361. That is, the apex 361 and its vicinity becomes a main heating portion during the heat-assisted operation of heating a portion of the magnetic record layer of the magnetic disk. Further, because the apex 361 and its vicinity as a main heating portion is positioned much close to the main magnetic pole layer 340 as a writing portion, write magnetic field can be applied shortly after applying heat to a portion of the magnetic record layer. As a result, stable write operation with the heat-assist can be performed reliably.

The near-field light generating element 36 is preferably formed of a conductive material such as Au, Ag, Al, Cu, Pd, Pt, Rh or Ir, or the alloy of at least two of these elements. Further, the apex 361 of the element 36 preferably has a curvature radius in the range 5 to 100 nm (nanometers). It is preferable that the distance $D_N$ in Z-axis direction between the bottom edge 360 and the apex 361 is sufficiently smaller than the wavelength of the incident laser light, being preferably in the range of 20 to 400 nm. It is also preferable that the width of the bottom edge 360 is sufficiently smaller than the wavelength of the incident laser light 48, being preferably in the range of 20 to 400 nm. Further, the thickness $T_{NF}$ in X-axis direction of the near-field light generating element 36 is preferably in the range of 10 to 100 nm.

Furthermore, it is preferable that the waveguide 35 has a multilayered structure of dielectric materials in which the upper a layer is, the higher becomes the refractive index n of the layer. The multilayered structure can be realized, for example, by sequentially stacking dielectric materials of $SiO_XN_Y$ with the composition ratio X and Y appropriately changed. The number of stacked layers may be, for example, in the range from 8 to 12. In the case that laser light 48 is linearly polarized in Z-axis direction, the above-described structure enables a light spot on the end surface 350 of the laser light 48 to be closer to the electromagnetic transducer 34 (on the trailing side) in Z-axis direction (in the direction along thickness $T_{WG}$). As a result, the near-field light generating element 36 can be provided much closer to the electromagnetic transducer 34 (on the trailing side) on the end surface 350. That is, the apex 361 of the near-field light generating element 36 is positioned more adjacent to the edge on the leading side of the main magnetic pole layer 340 of the electromagnetic transducer 34 described later, which enables near-field light to be irradiated more adequately on the write position at the time of writing.

(Light Source Unit)

Backing to FIG. 3a, the light source unit 23 includes: the unit substrate 230, the laser diode 40 provided on the source-installation surface 2302 of the unit substrate 23; the terminal electrode 410 electrically connected to the lower surface 401 as an electrode of the laser diode 40; and the terminal electrode 411 electrically connected to the upper surface 403 as an electrode of the laser diode 40. By applying a predetermined voltage between both electrodes 410 and 411 of the laser diode 40, laser light radiates from the emission center on the emission surface 400 of the laser diode 40.

The laser diode 40 is provided so that the emission surface 400 of the laser diode 40 is protruded from the joining surface 2300 of the unit substrate 230. That is, a portion 401a of the lower surface 401 of the laser diode 40 runs off the unit substrate 230. Further, as described later, the step 2213 is provided on the head-part end surface 2211 of the head part 221. In the heat-assisted magnetic recording head 21 constituted by joining the light source unit 23 and the slider 22, the joining surface 2300 of the unit substrate 230 has a surface contact with a portion 2211a on the slider substrate 220 side of the head-part end surface 2211 and the back surface 2201 of the slider substrate 220; and the portion 401a of the lower surface 401 of the laser diode 40, which is protruded from the unit substrate 230, has a surface contact with the wall surface 2213a of the step 2213. This joining configuration enables the light source unit 23 to be easily joined with high accuracy to the slider 22.

Each of the terminal electrodes 410 and 411 includes: a base layer formed on the source-installation surface 2302 of the unit substrate 230, made of, for example, Ta or Ti with thickness of approximately 10 nm; and a conductive layer formed on the base layer, made of, for example, Au or Cu with thickness of approximately 1 to 3 μm. As shown in FIG. 3a, the terminal electrode 410 may be electrically connected to the lead line extended from the lower surface 401 as an electrode of the laser diode 40, and the terminal electrode 411 may be electrically connected through a boding wire to the upper surface 403 as an electrode of the laser diode 40.

As explained above, the heat-assisted magnetic recording head 21 has a structure in which the slider 22 and the light source unit 23 are joined to each other. Therefore, the head 21 can be fabricated after the slider 22 and the light source unit 23 are manufactured independently of each other. As a result, for example, the characteristics of the light source unit 23 can be evaluated in advance; then only the non-defective unit can be used for the head fabrication. In this case, the manufacturing yield for obtaining the whole head becomes almost the same as the manufacturing yield of the slider 22. Therefore, the degradation of the manufacturing yield for obtaining the whole head can be avoided, the degradation depending on the percent defective of the laser diode 40.

Further, because the light source unit 23 is joined to the back surface 2201 opposite to the ABS 2200 of the slider 22, the laser diode 40 can be definitely located far away from the ABS 2200. As a result, the direct mechanical shock to the laser diode 40 during operation can be avoided.

Further, the head 21 has an affinity with the conventional manufacturing method of thin-film magnetic heads because the ABS 2200 and the element-integration surface 2202 are perpendicular to each other in the slider 22. Furthermore, the heat-assisted magnetic recording head 21 can be manufactured with reduced man-hour and at low cost, because of no need to provide the head 21 with optical components such as a lens or prism which are required to have much high accuracy, or optical elements having a special structure for connecting optical fibers or the like.

Each of the slider 22 and light source unit 23 may have an arbitrary size. For example, the slider 22 may be so-called a femto slider in which the width in the track width direction (Y-axis direction) is 700 μm; the length in Z-axis direction is 850 μm; and the thickness in X-axis direction is 230 μm. In the case, the light source unit 23 may be one size smaller than the slider 22, for example, in which the width in the track width direction is 425 μm; the length is 300 μm; and the thickness is 300 μm.

Figure 4:
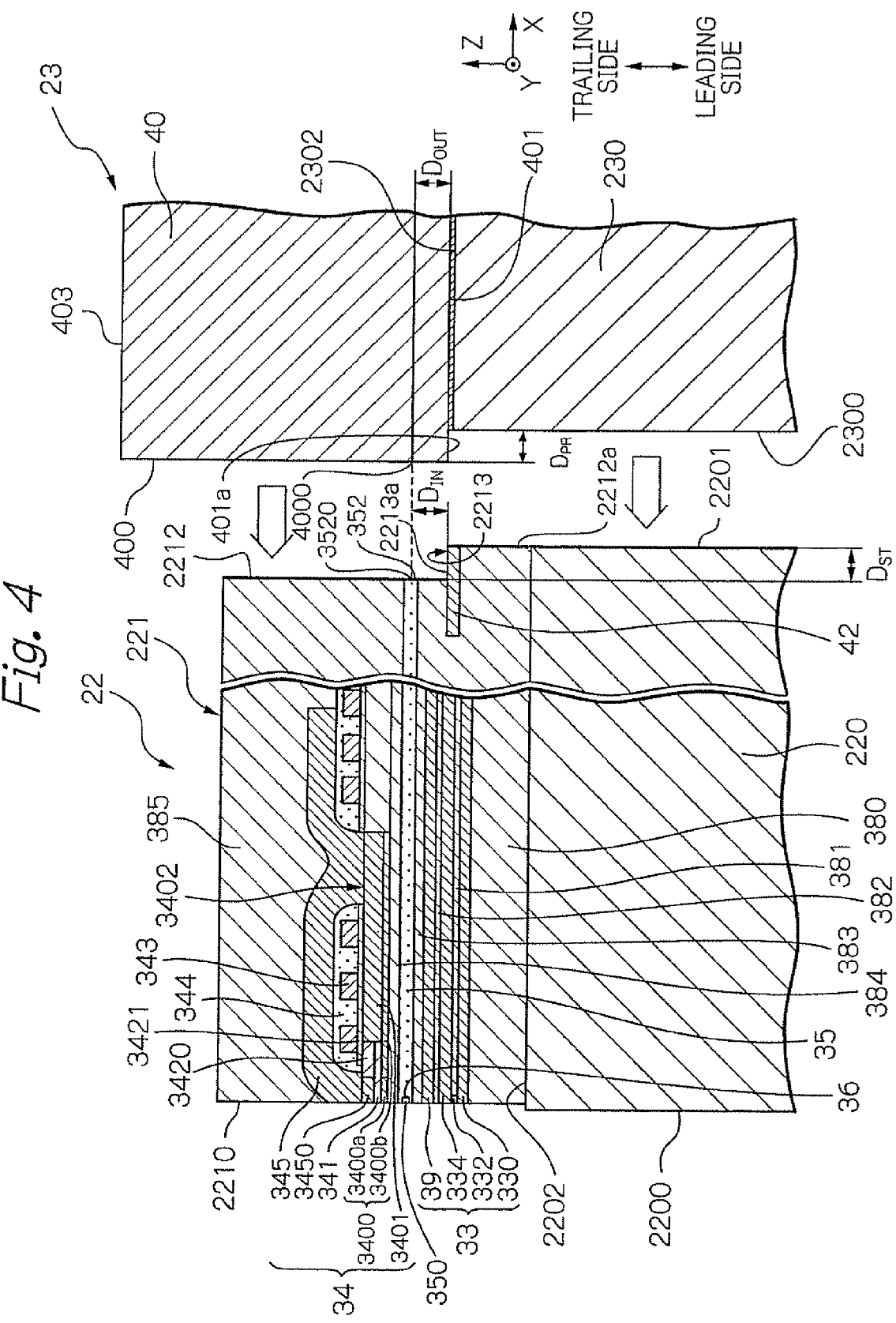
FIG. 4 shows a cross-sectional view taken by plane A in FIG. 3a, schematically illustrating a main portion of the heat-assisted magnetic recording head.

FIG. 4 shows a cross-sectional view taken by plane A in FIG. 3a, schematically illustrating a main portion of the heat-assisted magnetic recording head 21.

(MR Element)

As shown in FIG. 4, the MR element 33 is formed on the insulating layer 380 stacked on the element-integration surface 2202, and includes: an MR multilayer 332; and a lower shield layer 330 and an upper shield layer 334 which sandwich the MR multilayer 332 and the insulating layer 381 therebetween. The upper and lower shield layers 334 and 330 prevent the MR multilayer 332 from receiving external magnetic field as a noise. The upper and lower shield layers 334 and 330 are magnetic layers formed of soft-magnetic materials such as NiFe (Permalloy), FeSiAl (Sendust), CoFeNi, CoFe, FeN, FeZrN or CoZrTaCr, or the multilayer of at least two of these materials, with thickness of approximately 0.3 to 5 μm.

The MR multilayer 332 is a magneto-sensitive part for detecting signal magnetic field by using MR effect. The MR multilayer 332 may be, for example: a current-in-plane giant magnetoresistive (CIP-GMR) multilayer that utilizes CIP-GMR effect; a current-perpendicular-to-plane giant magnetoresistive (CPP-GMR) multilayer that utilizes CPP-GMR effect; or a tunnel magnetoresistive (TMR) multilayer that utilizes TMR effect. The MR multilayer 332 that utilizes any MR effect described above can detect signal magnetic field from the magnetic disk with high sensitivity. In the case that the MR multilayer 332 is a CPP-GMR multilayer or a TMR multilayer, the upper and lower shield layers 334 and 330 act as electrodes. Whereas, in the case that the MR multilayer 332 is a CIP-GMR multilayer, insulating layers are provided between the MR multilayer 332 and respective upper and lower shield layers 334 and 330; further, formed are MR lead layers that is electrically connected to the MR multilayer 332.

In the case of TMR multilayer, for example, the MR multilayer 332 may have a stacked structure in which sequentially stacked are: an antiferromagnetic layer made of, for example, IrMn, PtMn, NiMn or RuRhMn, with thickness of approximately 5 to 15 nm; a magnetization-direction-fixed layer (pinned layer) in which two ferromagnetic layers such as CoFe sandwich a non-magnetic metal layer such as Ru therebetween, and the direction of the magnetization is fixed by the antiferromagnetic layer; a tunnel barrier layer made of a non-magnetic dielectric material obtained by the process that a metal film such as Al or AlCu, for example, with thickness of approximately 0.5 to 1 nm is oxidized by oxygen introduced into the vacuum equipment, or is naturally oxidized; and a magnetization-direction-free layer (free layer) having a double-layered structure of a ferromagnetic material such as CoFe, for example, with thickness of approximately 1 nm and a ferromagnetic material such as NiFe, for example, with thickness of approximately 3 to 4 nm, which has a tunnel exchange interaction with the pinned layer through the tunnel barrier layer.

(Electromagnetic Transducer)

Also as shown in FIG. 4, the electromagnetic transducer 34 is designed for perpendicular magnetic recording, and includes a main magnetic pole layer 340, a gap layer 341, a write coil layer 343, a coil insulating layer 344, and a write shield layer 345.

The main magnetic pole layer 340 is provided on an insulating layer 384 made of an insulating material such as $Al_2O_3$ (alumina), and acts as a magnetic path for converging and guiding a magnetic flux toward the magnetic record layer (perpendicular magnetization layer) of the magnetic disk 10, the magnetic flux being excited by write current flowing through the write coil layer 343. The main magnetic pole layer 340 has a double-layered structure in which a main magnetic pole 3400 and a main pole body 3401 are stacked sequentially and magnetically coupled with each other. The main magnetic pole 3400 is isolated by being surrounded with an insulating layer 384 formed of an insulating material such as $Al_2O_3$ (alumina). The main magnetic pole 3400 reaches the head-part end surface 2210, and includes: a main pole front end 3400a extending to the head-part end surface 2210, with a small width $P_W$ (FIG. 3c) in the track width direction; and a main pole rear end 3400b located at the rear of the main pole front end 3400a and having a width in the track width direction larger than that of the main pole front end 3400a. Here, the small width $P_W$ of the main pole front end 3400a enables a fine write magnetic field to be generated, so that the track width can be set to be a very small value adequate for higher recording density.

As shown in FIG. 3c, the main magnetic pole 340 appearing on the head-part end surface 2210 has an upside-down trapezoidal shape with a longer edge on the trailing side. The width $P_W$ of the main pole front end 3400a is the length of the longer edge, which determines the width of track formed on the perpendicular magnetization layer of the magnetic disk. The width $P_W$ is, for example, in the range of approximately 0.05 to 0.5 μm. To put it differently, the end surface of the main magnetic pole layer 340 has a bevel angle θ on the head-part end surface 2210. Providing the bevel angle θ works for preventing unwanted writing or erasing to the adjacent tracks due to the influence of a skew angle of the head, which arises from the movement of rotary actuator. The bevel angle may be, for example, approximately 15°.

Backing to FIG. 4, the main magnetic pole 3400 is formed of a soft-magnetic material with saturation magnetic flux density higher than that of the main pole body 3401, which is, for example, an iron alloy containing Fe as a main component, such as FeNi, FeCo, FeCoNi, FeN or FeZrN. The thickness of the main magnetic pole 3400 is, for example, in the range of approximately 0.2 to 0.5 μm.

The gap layer 341 forms a gap provided for separating the main magnetic pole layer 340 from the write shield layer 345 in the region near the head-part end surface. The gap layer 341 is formed, for example, of a non-magnetic insulating material such as $Al_2O_3$ (alumina), $SiO_2$ (silicon dioxide), AlN (aluminum nitride) or DLC, or formed of a non-magnetic conductive material such as Ru (ruthenium). The thickness of the gap layer 341 determines the spacing between the main magnetic pole layer 340 and the write shield layer 345, and is, for example, in the range of approximately 0.01 to 0.5 μm.

The write coil layer 343 is formed on a insulating layer 3421 made of an insulating material such as $Al_2O_3$ (alumina), in such a way to pass through in one turn at least between the main magnetic pole layer 340 and the write shield layer 345, and has a spiral structure with a back contact portion 3402 as a center. The write coil layer 343 is formed of a conductive material such as Cu (copper). The write coil layer 343 is covered with a coil insulating layer 344 that is formed of an insulating material such as a heat-cured photoresist and electrically isolates the write coil layer 343 from the main magnetic pole layer 340 and the write shield layer 345.

The write coil layer 343 has a monolayer structure in the present embodiment, however, may have a two or more layered structure or a helical coil shape. Further, the number of turns of the write coil layer 343 is not limited to that shown in FIG. 4, and may be, for example, in the range from two to seven.

The write shield layer 345 reaches the head-part end surface 2210, and acts as a magnetic path for the magnetic flux returning from a soft-magnetic under layer that is provided under the perpendicular magnetization layer of the magnetic disk. The thickness of the write shield layer 345 is, for example, approximately 0.5 to 5 µm. Further, the write shield layer 345 has a trailing shield 3450 that is a portion opposed to the main magnetic pole layer 340. The trailing shield 3450 also extends to the head-part end surface 2210, and is provided for receiving the magnetic flux spreading from the main magnetic pole layer 340. The trailing shield 3450, according to the present embodiment, is planarized together with an insulating layer 3420 and the main pole body 3401, and has a width in the track width direction larger than the width of the main pole rear end 3400b and the main pole body 3401 as well as the main pole front end 3400a. This trailing shield 3450 causes the magnetic field gradient between the end portion of the trailing shield 3450 and the main pole front end 3400a to be steeper. As a result, a jitter of signal output becomes smaller, and therefore, error rates during read operation can be reduced. The write shield layer 345 is formed of a soft-magnetic material; especially, the trailing shield 3450 is formed of a material with high saturation magnetic flux density such as NiFe (Permalloy) or formed of an iron alloy as the main magnetic pole 3400 is formed of.

Further, in the present embodiment, an inter-element shield layer 39 is provided between the MR element 33 and the electromagnetic transducer 34, sandwiched by the insulating layers 382 and 383. The inter-element shield layer 39 plays a role for shielding the MR element 33 from the magnetic field generated from the electromagnetic transducer 34, and may be formed of the same soft-magnetic material as the upper and lower shield layers 334 and 330. The inter-element shield layer 39 is not indispensable: the embodiment without the inter-element shield layer could be in the scope of the present invention. Further, a backing coil portion may be provided between the inter-element shield layer 39 and the waveguide 35. The backing coil portion is a coil portion for generating magnetic flux to negate a magnetic flux loop that is generated from the electromagnetic transducer 34 and passes through the upper and lower shield layers 334 and 330 of the MR element 33. Thus, the backing coil portion intends to suppress wide adjacent track erasure (WATE), that is, unwanted writing or erasing to the magnetic disk.

Alternatively, the electromagnetic transducer 34 may be designed for longitudinal magnetic recording. In this case, an upper magnetic pole layer and a lower magnetic pole layer are provided instead of the main magnetic pole layer 340 and the write shield layer 344, and further provided is a write gap layer pinched by the end portions on the head-part end surface 2210 side of the upper and lower magnetic pole layers. Write operation is performed by using leakage field generated from the pinched portion of the write gap layer. Meanwhile, the above-described insulating layers 380, 381, 382, 383, 384 and 385 constitute the overcoat layer 38.

(Joining of Light Source Unit and Slider)

Also as shown in FIG. 4, as described above, the step 2213 is provided on the head-part end surface 2211 of the head part 221 in the slider 22. Here, the wall surface 2213a of the step 2213 is a portion of the upper surface of the stopper layer 42. On the other hand, the portion 401a of the lower surface 401 of the laser diode 40 is protruded from the unit substrate 230. In the heat-assisted magnetic recording head 21 constituted by joining the light source unit 23 and the slider 22, the joining surface 2300 of the unit substrate 230 has a surface contact with a portion 2211a on the slider substrate 220 side of the head-part end surface 2211 and the back surface 2201 of the slider substrate 220; and the protruded portion 401a of the lower surface 401 of the laser diode 40 has a surface contact with the wall surface 2213a of the step 2213, that is a portion of the upper surface of the stopper layer 42.

Here, the height of the step 2213 (the height of the wall surface 2213a) is denoted by $D_{ST}$, and the amount of protrusion of the laser diode 40 is denoted by $D_{PR}$. In order to avoid applying unnecessary stress to the laser diode 40, and thus in order for the joining surface 2300 to have a appropriate surface contact with the portion 2211a and the backing surface 2201, the $D_{ST}$ and $D_{PR}$ are set to satisfy the following relational expression (1):

$$D_{ST} > D_{PR} - t_{AD}, \quad (1)$$

where $t_{AD}$ is a thickness of the adhesive by which the slider 22 and the light source unit 23 are adhered. In practice, the value $D_{ST} - (D_{PR} - t_{AD})$ is preferably set to be in the range of approximately 1 to 5 µm, under the consideration of the propagation efficiency of laser light. And the amount of protrusion $D_{PR}$ is set to be, for example, in the range of approximately 1 to 5 µm.

Further, the waveguide 35 in the head-part 221 has an incident center 3520 on its end surface 352. The incident center 3520 can be set as a midpoint of the end surface 352 in the direction perpendicular to the element-integration surface 2202 (in Z-axis direction). However, the position of the incident center 3520 on the end surface 352 can be a point other than the just midpoint by adjusting the layered structure in the case that the waveguide 35 has a multilayered structure of dielectric materials as described above. On the other hand, the laser diode 40 in the light source unit 23 has an emission center 4000 on its emission surface 400. The emission center 4000 can be a midpoint of the active layer 40e (FIG. 5) in the direction perpendicular to the source-installation surface 2302 (in Z-axis direction).

Furthermore, the distance between the wall surface 2213a, that is, the upper surface of the stopper layer 42 and the incident center 3520 of the waveguide 35 is denoted by $D_{IN}$, and the distance between the lower surface 401 of the laser diode 40 and the emission center 4000 is denoted by $D_{OUT}$. Here, in the present invention, the $D_{IN}$ and $D_{OUT}$ are set to be equal to each other, that is, they satisfy the following relational expression (2):

$$D_{IN} = D_{OUT}. \quad (2)$$

By satisfying the above relation, the maximum amount of laser light generated from the laser diode 40 can enter the waveguide 35 and reach the near-field light generating element 36. As a result, improved is the efficiency of generating the near-field light.

For setting the distance $D_{IN}$, all the processes from forming the stopper layer 42 to forming the waveguide 35 in the element-integration surface 2202 of the slider 22 can be performed as thin-film processes utilizing various depositing techniques, etching techniques and photolithography techniques. In these processes, the distance $D_{IN}$ can be set to have an accuracy within, for example, ±0.5 µm, by controlling the thickness of each of the constituent layers. Further, for setting the distance $D_{OUT}$, the whole multilayered structure of the laser diode 40 shown in FIG. 5 can be formed, for example, by using the above-described thin-film processes. In these processes, the distance $D_{OUT}$ can also be set to have an accuracy within, for example, ±0.5 µm, by controlling the thickness of each of the constituent layers. Whereas, in the case that the step 2213 in the head-part end surface 2211 is formed by using machining processes, processing accuracy of the distance $D_{IN}$ is generally at least ±5 µm; thus it is difficult to reliably satisfy the relational expression (2). As another method, thin-film processes utilizing photolithography and so on may be adopted directly to the head-part end surface 2211. However, this method is not so preferable because the processes become significantly complicated.

The distance $D_{IN}$ (and $D_{OUT}$) is preferably set to be a value in the range of 2 to 10 μm. In the case that the distance $D_{IN}$ is less than 2 μm, the specifications of the laser diode 40 is unfavorably restricted. For example, the thickness of the layer formed between the p-electrode and the active layer described above would need to be set to be 1 μm or less. Whereas, in the case that the distance $D_{IN}$ is more than 10 μm, the variation in layer thickness of the multilayered structure would become significantly larger through the thin-film processes.

As described above, the light source unit 23 and slider 22 according to the present invention can easily and reliably realize the head configuration satisfying the relational expression (2) with high accuracy. As a result, in the state of joining the light source unit 23 to the slider 22, positional accuracy (optical-axis-alignment accuracy) of the laser diode 40 and the waveguide 35 can become sufficiently high.

Meanwhile, the stopper layer 42 may be a plurality of layers aligned in the track width direction (Y-axis direction). That is, the step structure according to the present invention can be realized in the case that at least a portion of the wall surface 2213a of the step 2213 is a portion of the upper surface of one stopper layer or portions of the upper surfaces of the plural stopper layers.

Figure 5:
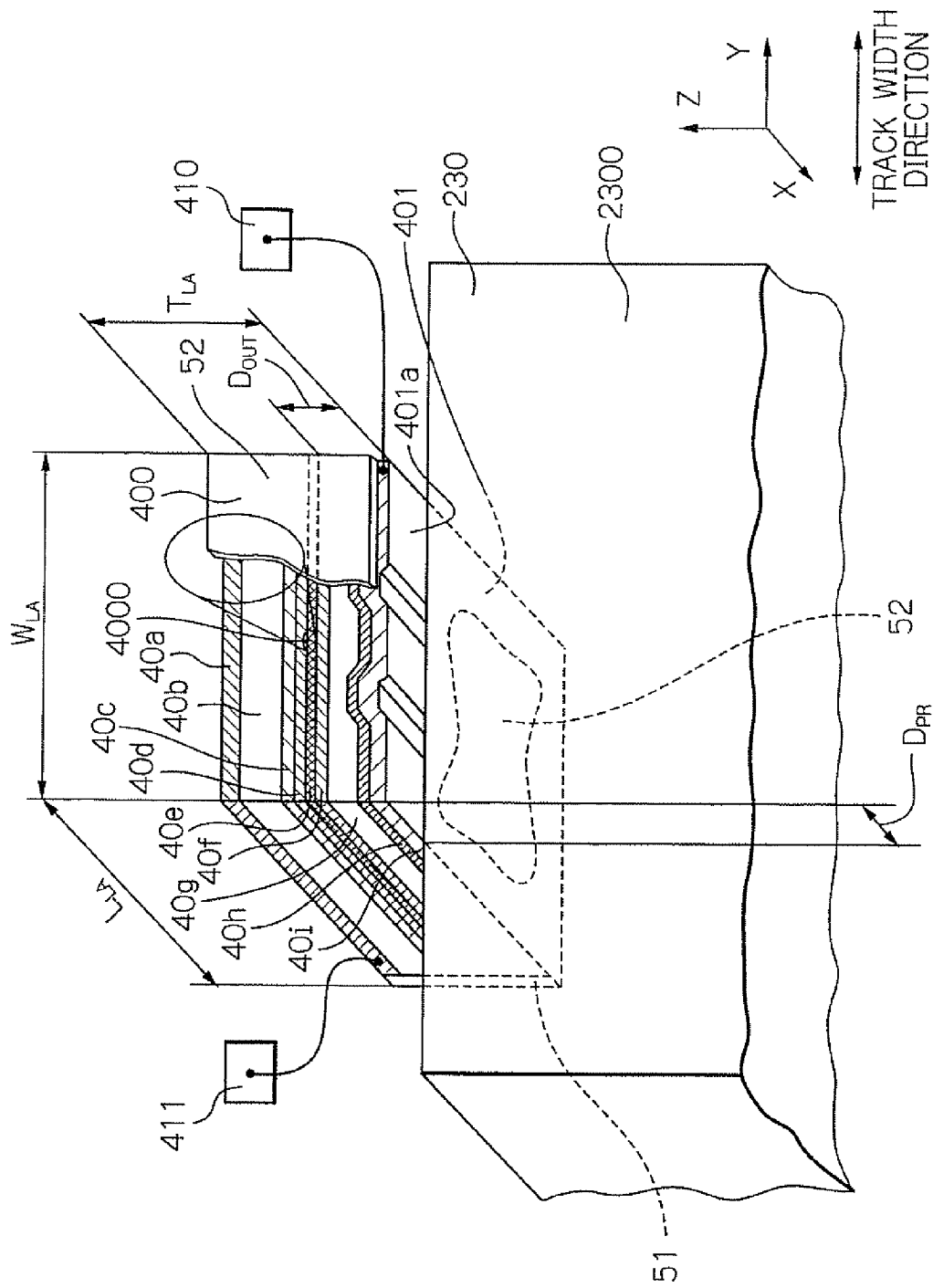
FIG. 5 shows a perspective view illustrating the structure of the laser diode and the state of joining the laser diode to the unit substrate.

FIG. 5 shows a perspective view illustrating the structure of the laser diode 40 and the state of joining the laser diode 40 to the unit substrate 230.

(Laser Diode)

According to FIG. 5, the laser diode 40 has, in the present embodiment, a multilayered structure in which sequentially stacked is an n-electrode 40a, an n-GaAs substrate 40b, an n-InGaAlP clad layer 40c, the first InGaAlP guide layer 40d, an active layer 40e formed of multiquantum well (InGaP/InGaAlP) or the like, the second InGaAlP guide layer 40f, an p-InGaAlP clad layer 40g, p-electrode base layer 40h, and p-electrode 40i. That is to say, in the actual manufacturing of the laser diode 40, the above-described layers are sequentially stacked with the n-electrode 40a as a bottom. On the front and rear cleaved surfaces of the multilayered structure, respectively formed are reflective layers 50 and 51 made of, for example, $SiO_2$ or $Al_2O_3$ for exciting the oscillation by total reflection. The outer surface of the reflective layer 50 is the emission surface 400. Further, the reflective layer 50 has an opening (not shown in the figure) in the position of the active layer 40e including the emission center 4000.

The wavelength $\lambda_L$ of the radiated laser light may be, for example, in the range of approximately 600 to 650 nm. It should be noted that there is an appropriate exciting wavelength according to the constituent material of the near-field light generating element 36. For example, the wavelength $\lambda_L$ of the laser light is preferably a value close to 600 nm.

The laser diode 40 has, for example, a width $W_{LA}$ of approximately 200 to 350 μm, a length (depth) $L_{LA}$ of 250 to 600 μm, and a thickness $T_{LA}$ of approximately 60 to 200 μm. The width $W_{LA}$ of the laser diode 40 may be decreased to approximately 100 μm. However, the $L_{LA}$ of the laser diode 40 relates to the electric current density, thus cannot be set to be a much smaller value. In first place, the laser diode 40 preferably has a certain size for facilitating the handling of the laser diode 40 during mounting.

An electric source provided within the magnetic disk drive apparatus can be used for driving the laser diode 40. In fact, the magnetic disk drive apparatus usually has an electric source with applying voltage of, for example, approximately 2V, which is sufficient for the laser oscillation. The amount of electric power consumption of the laser diode 40 is, for example, in the order of several tens mW, which can be covered sufficiently by the electric source provided within the magnetic disk drive apparatus. In practice, a predetermined voltage is applied between the terminal electrode 410 connected electrically to the p-electrode 40i and the terminal electrode 411 connected electrically to the n-electrode 40a by using the electric source, to oscillate the laser diode 40. Then, laser light radiates from the opening including the emission center 4000 of the reflective layer 50.

Also as shown in FIG. 5, the lower surface 401, that is, the surface of the p-electrode 40i of the laser diode 40 is adhered to the source-installation surface 2302 of the unit substrate 230. This adhering can be performed by, for example, soldering with AuSn alloy 52 as a Pb-free solder. Here, the unit substrate 230 formed of, for example, AlTiC can have an electric conductivity. Thus, the unit substrate 230 can acts as a ground connected to the p-electrode 40i.

Further, on adhering the laser diode 40 on the unit substrate 230, the emission surface 400 of the laser diode 40 is protruded from the joining surface 2300 of the unit substrate 230 by the distance $D_{PR}$. That is, a portion 401a of the lower surface 401 of the laser diode 40 runs off the unit substrate 230. The amount of protrusion $D_{PR}$ of the laser diode 40 satisfies the relation: $D_{ST} > D_{PR} - t_{AD}$, as described above. Here, the $D_{ST}$ is the height of the step 2213 of the head-part 221, and the $t_{AD}$ is the thickness of the adhesive.

The laser diode 40 and terminal electrodes 410 and 411 are not limited to the above-described embodiment. For example, the n-electrode 40a may be adhered on the source-installation surface 2302 of the unit substrate 230, by turning the electrodes of the laser diode 40 upside down. Alternatively, the p-electrode 40i may be removed from the protruded portion 401a of the lower surface 401 of the laser diode 40; that is, the portion 401a may be a portion of the lower surface of the p-electrode base layer 40h. Further, the laser diode 40 may have another structure using other semiconducting materials such as GaAlAs system. The same structure as diodes usually used for optical disk storages may be adopted for the laser diode 40. Solders other than the above described can also be used. Further, terminal electrodes may be formed in the state that both the electrodes of the laser diode 40 is isolated from the unit substrate.

(The Whole Method for Manufacturing Head)

Figure 6:
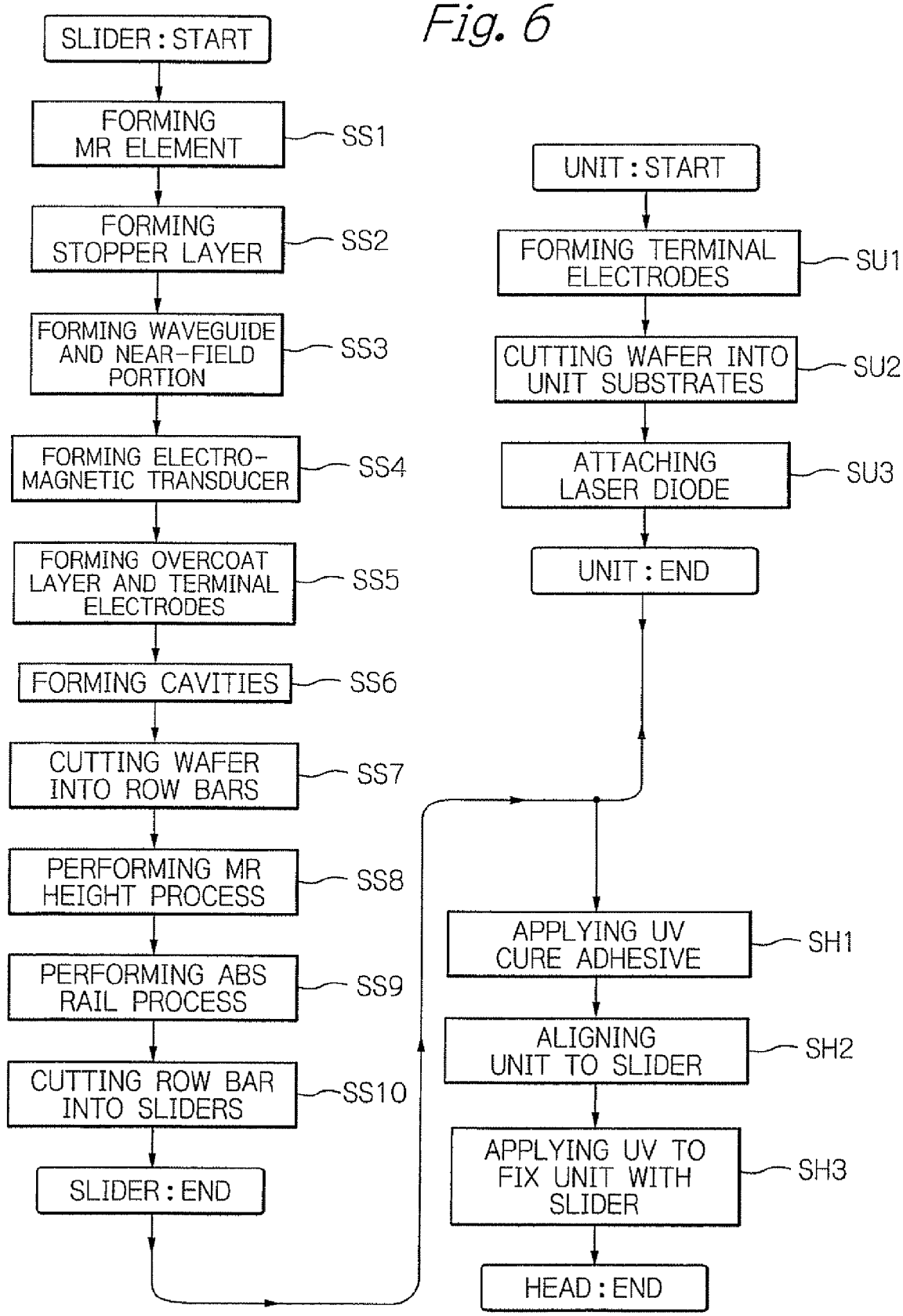
FIG. 6 shows a flowchart schematically illustrating one embodiment of the manufacturing method of the heat-assisted magnetic recording head according to the present invention.
Figure 7A:
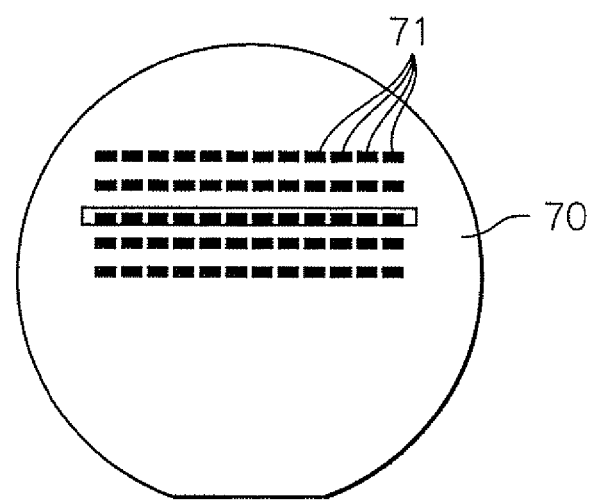
FIGS. 7a to 7e show schematic views illustrating a part of processes of the embodiment of manufacturing method.
Figure 7B:
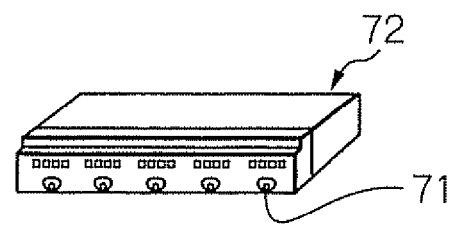
Figure 7C:
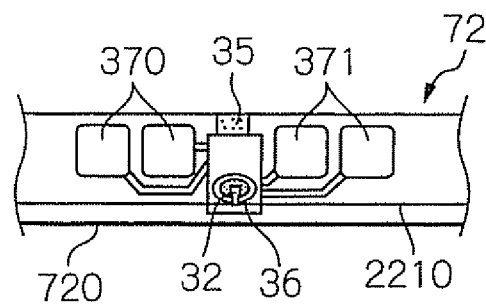
Figure 7D:
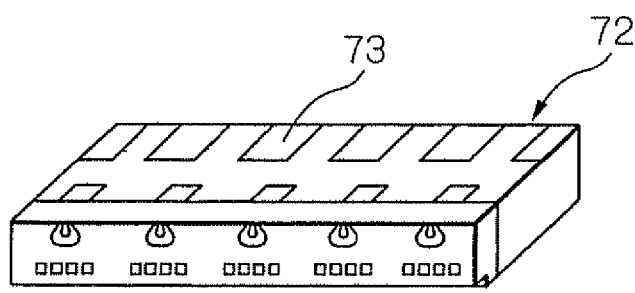
Figure 7E:
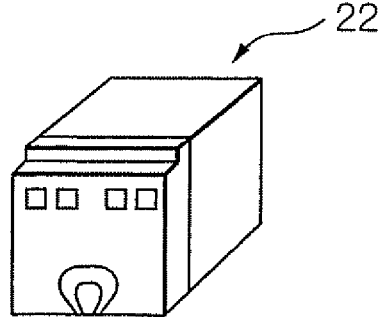

FIG. 6 shows a flowchart schematically illustrating one embodiment of the manufacturing method of the heat-assisted magnetic recording head according to the present invention. And FIGS. 7a to 7e show schematic views illustrating a part of processes of the embodiment of manufacturing method.

First, explained will be the method for manufacturing the slider 22 (Step SS1 to Step SS10). According to FIG. 6, first, MR elements 33 are formed on the element-integration surface of a substrate wafer 70 (FIG. 7a) to become slider substrates 220, by using the well-known method (Step SS1). Next, stopper layers 42 are formed (Step SS2). The method for forming the stopper layers 42 will be explained later in detail. After that, formed are waveguides 35 and near-field light generating elements 36 (Step SS3). The method for forming the waveguides 35 and near-field light generating elements 36 will also be explained later in detail. Next, electromagnetic transducers 34 are formed by using the well-known method (Step SS4). After that, overcoat layer 38 and terminal electrodes 370 and 371 are formed by using the well-known method (Step SS5). Next, cavities for fabricating the steps 2213 are formed on the end surfaces 2211 of the head-parts 221 (Step SS6). The method for forming the cavities will also be explained later in detail. Hereby, the wafer thin-film process is finished for forming head element patterns 71 (FIG. 7*a*) on the wafer substrate 70 (FIG. 7*a*), each of which includes the head element 32, the stopper layer 42, the waveguide 35, the near-field light generating element 36, and the terminal electrodes 370 and 371.

Next, the wafer substrate 70, which has finished the wafer thin-film process, is bonded to a cutting and separating jig by using a resin or the like; and is cut into slider row bars 72 (FIG. 7*b*) in each of which a plurality of head element patterns 71 is aligned (Step SS7). Thereafter, the slider row bar 72 is bonded to a polishing jig by using a resin or the like and is polished. That is, an MR height process for determining an MR height of the MR multilayer (that is, the length in the direction perpendicular to the ABS of the MR multilayer) is applied to the end surface 720 (FIG. 7*c*) on the ABS side of the slider row bar 72 (Step SS8). The MR height process is performed until: the head element 32 and near-field light generating element 36 are exposed in the head-part end surface 2210; MR multilayer 332 has a predetermined MR height; and the near-field light generating element 36 has a predetermined thickness $T_{NF}$ (FIG. 3*b*).

After that, the slider row bar 72, which has undergone the MR height process, is bonded to a rail forming jig by using a resin or the like; and then, the process for forming rails 73 (FIG. 7*d*) on the ABS is performed (Step SS9), to complete the manufacturing process of the slider row bar 72. Thereafter, the slider row bar is cut to be separated into individual sliders 22 (FIG. 7*e*) (Step SS10). Thereby, the machining process is finished; and the manufacturing process of the slider 22 is completed.

Next, explained will be the method for manufacturing the light source unit 23. According to FIG. 6, first, terminal electrodes 410 and 411 are formed on the element-integration surface of a substrate wafer to become unit substrates 230 (Step SU1). After that, the wafer substrate is bonded to a cutting and separating jig by using a resin or the like; and is cut into unit substrates 230 (Step SU2). Next, the laser diode 40 is attached (fixed) on the unit substrate 230 (Step SU3). The method for fixing the laser diode 40 will be explained later in detail. Thereby, the manufacturing process of the light source unit 23 is completed.

At the last, explained will be the method for joining the slider 22 and the light source unit 23. According to FIG. 6, first, a UV (ultraviolet) cure adhesive is applied, in advance, to the backing surface 2201 of the slider 22 or the joining surface 2300 of the light source unit 23, or to both the surfaces (Step SH1). Next, the light source unit 23 is joined (aligned) to the slider 22 so that the protruded portion of the laser diode 40 is fitted in the step 2213 formed on the head-part end surface 2211 of the slider 22 (Step SH2). The joining method will be explained later in detail. Finally, the slider 22 and the light source unit 23 are firmly fixed by applying UV (ultraviolet) (Step SH3). Thereby, the manufacturing process of the heat-assisted magnetic recording head 21 is completed.

(Formation of Stopper Layer and Step)

FIGS. 8*a* to 8*d* show cross-sectional views for explaining Step SS2 of forming the stopper layer 42 and Step SS6 of forming the cavity to form the step 2213.

Figure 8A:
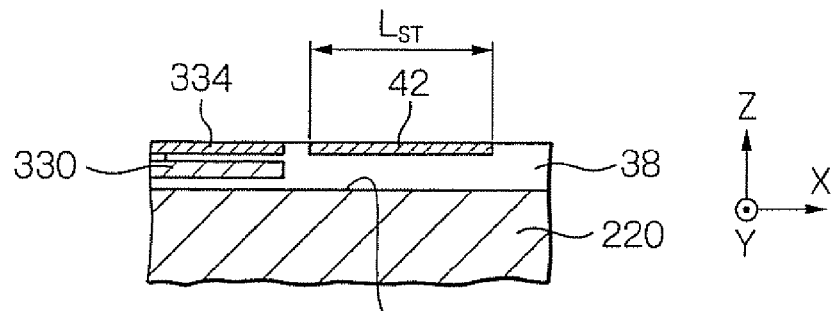
FIGS. 8a to 8d show cross-sectional views for explaining Step SS2 of forming the stopper layer and Step SS6 of forming the cavity to form the step3.

As shown in FIG. 8*a*, first, in the forming process of the MR element 33, the stopper layer 42 is formed simultaneously with the deposition for forming the upper shield layer 334. In the case, the stopper layer 42 is formed of the same magnetic metal as that which the upper shield layer 334 is formed of. The simultaneous formation of the upper shield layer 334 and the stopper layer 42 enables the man-hour to be reduced. Alternatively, the stopper layer 42 may be formed independently, or may be formed at the same time as the formation of the lower shield layer 330 or the inter-element shield layer 39.

The stopper layer 42 is provided so that the end of the stopper layer 42 on the head-part end surface 2210 side is positioned closer to the head-part end surface 2210 than the incident center 3520 of the waveguide 35 in the direction perpendicular to the head-part end surface 2210 (X-axis direction). Further, the length $L_{ST}$ in X-axis direction of the stopper layer 42 is preferably set to be large enough to become the bottom of cavity 75 that will be formed later.

Figure 8B:
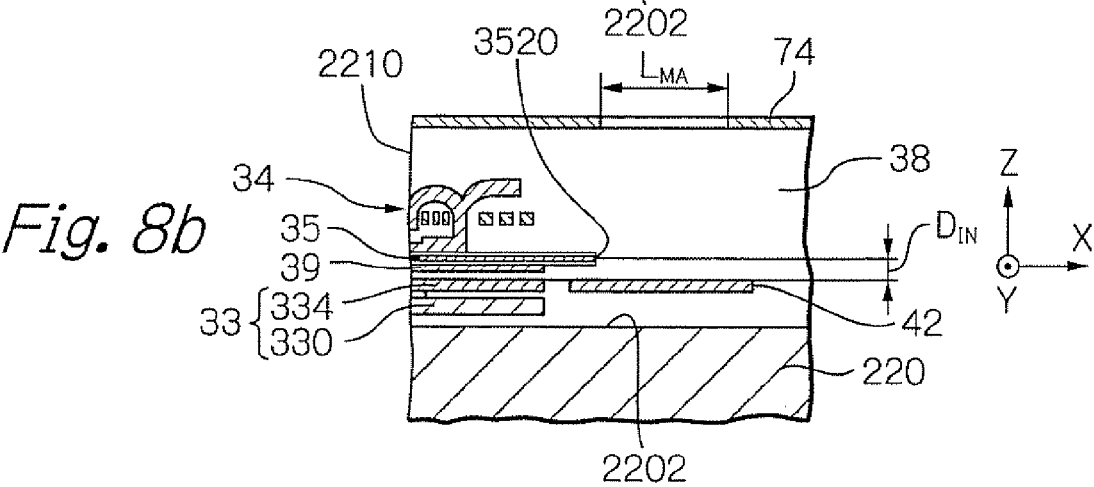

Next, an insulating layer is formed so as to cover the upper shield layer 334 and the stopper layer 42; then, the upper surface of the insulating layer is planarized by using, for example, chemical mechanical polishing (CMP). Next, as shown in FIG. 8*b*, the waveguide 35 and the near-field light generating element 36, and then the electromagnetic transducer 34 are formed. After that, formed is the overcoat layer 38. Here, the distance $D_{IN}$ between the upper surface of the stopper layer 42 and the incident center 3520 of the waveguide 35 is set to be equal to the distance $D_{OUT}$ between the lower surface 401 of the laser diode 40 and the emission center 4000 in the light source unit 23 that is independently manufactured.

Figure 8C:
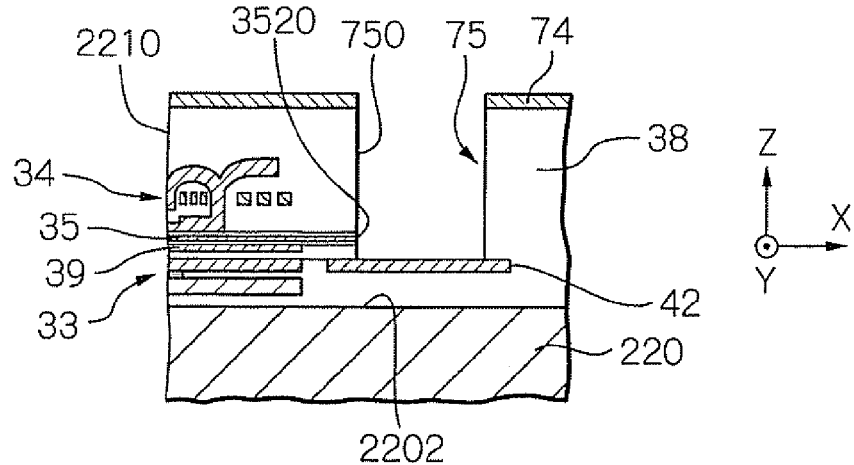

After that, as shown in FIG. 8*b*, an etching mask 74 made of, for example, a photoresist is formed on the upper surface of the overcoat layer 38. Then, as shown in FIG. 8*c*, a cavity 75 is formed by using dry-etching method such as a reactive ion etching (RIE), the bottom of the cavity 75 being a portion of the upper surface of the stopper layer 42. The size $L_{MA}$ of the aperture of the etching mask 74 (FIG. 8*b*) needs to be large enough to form a desirable cavity 75; for example, may be in the range of approximately 10 to 100 µm. As an alternative of the etching, the cavity 75 can also be formed by using wet-etching method in which NaOH (sodium hydroxide) solution is used as an etchant in the case that the overcoat layer 38 is formed of, for example, $Al_2O_3$ (alumina). In both the dry- and wet-etching cases, the stopper layer 42, which is formed of, for example, NiFe (Permalloy) by a sputtering or plating as described above, has a much lower etching rate than the overcoat layer 38; thus the stopper layer 42 acts as an etching stopper.

Figure 8D:
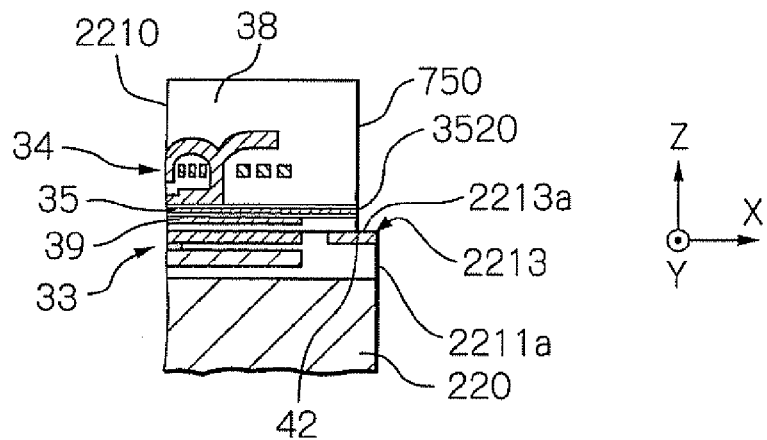

After that, as shown in FIG. 8*d*, the portion on the no-head-element-pattern side in relation to the cavity 75 is removed out, in the process of cutting the wafer into slider row bars (Step SS7 of FIG. 6); as a result, formed is the step 2213. Here, the remaining wall surface 750 of the cavity 75 becomes a portion of the head-part end surface 2211. And the exposed portion of the upper surface of the remaining stopper layer 42 becomes the wall surface 2213*a* of the step 2213.

Figure 9A:
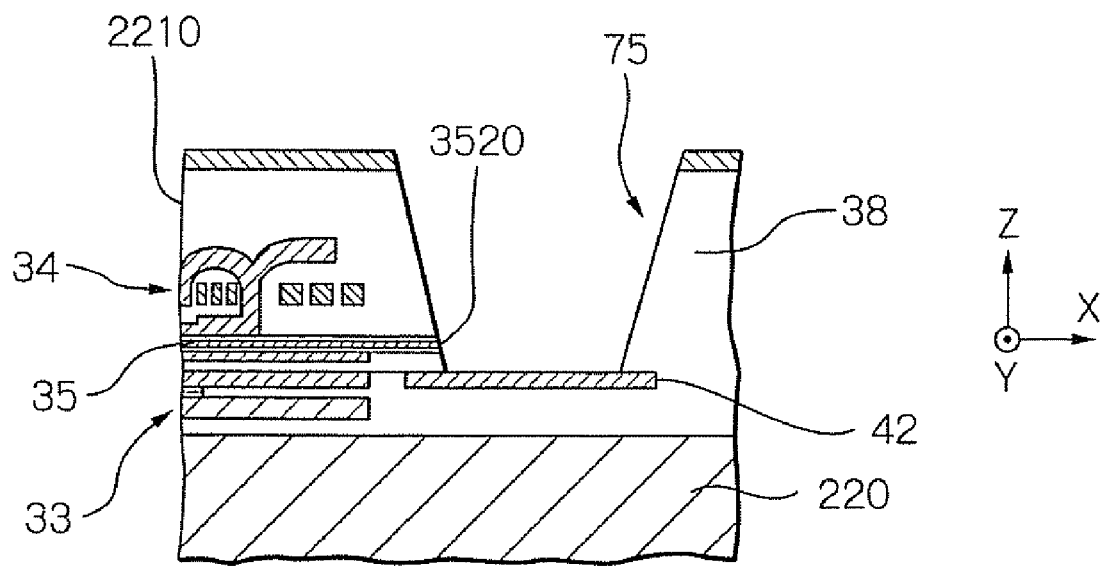
FIGS. 9a and 9b show cross-sectional views for explaining the modification of forming the above-described cavity.
Figure 9B:
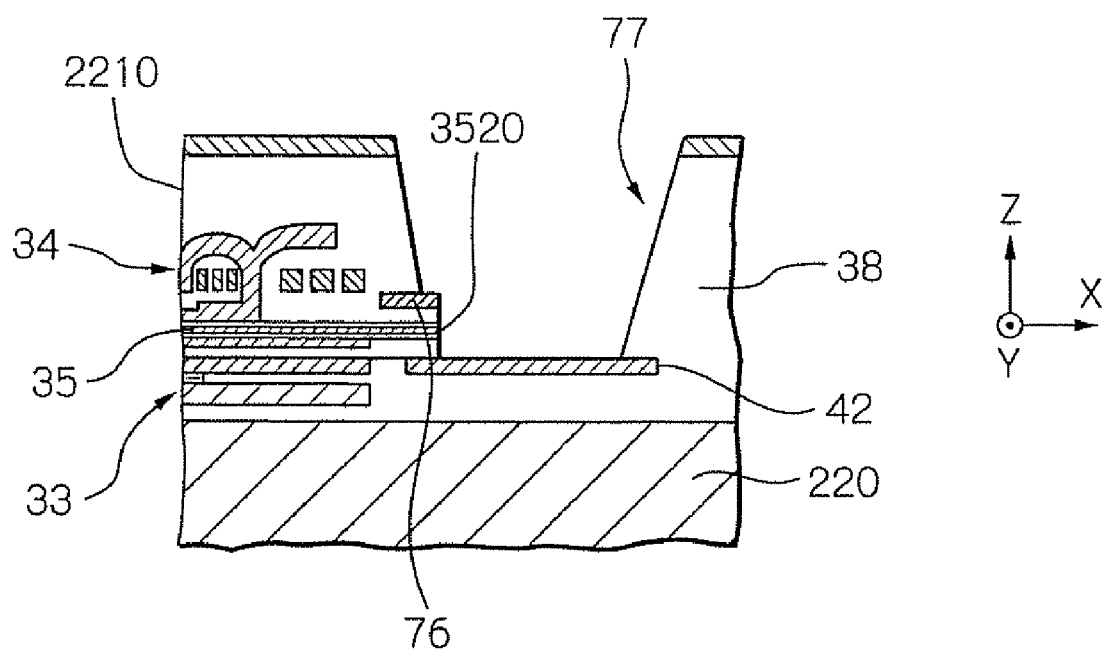

FIGS. 9*a* and 9*b* show cross-sectional views for explaining the modification of forming the above-described cavity.

Generally, though depending on the etching conditions, the cavity 75 obtained by etching the overcoat layer 38 with significantly large thickness is likely to become so-called "mortar-shaped" one as shown in FIG. 9*a*. Therefore, usually, the remaining wall surface 750 of the cavity 75 does not become perpendicular to the element-integration surface 2202 after cutting out the slider row bar. Especially in the case that the wall surface 750 near the incident center 3520 (that is, the end surface 352 of the waveguide 35) is not perpendicular to the element-integration surface 2202, the incident efficiency of entering laser light into the waveguide 35 is likely to be lowered. As a countermeasure, explained will be a method of forming an additional stopper layer.

According to FIG. 9*b*, an additional stopper layer 76 is formed, after forming the waveguide 35. The additional stopper layer 76 may be formed, for example, simultaneously with the deposition for forming any magnetic metal layer during the formation of the electromagnetic transducer 34; or may be formed independently. The constituent material of the additional stopper 76 is chosen so that the additional stopper layer 76 can act as an etching-stopper during the above-described etching, as the stopper layer 42 acts. The additional stopper layer 76 is preferably provided in a position above the waveguide 35 and close to the waveguide 35 in Z-axis direction. Further, the position of the end of the additional stopper layer 76 on the side opposite to the head-part end surface 2210 is set, under the consideration that the end position determines the position of the incident center 3520 of the waveguide 35 in the direction perpendicular to the head-part end surface 2210 (X-axis direction)

Forming the above-described additional stopper layer 76 and performing the above-described etching enable the wall surface near the incident center 3520 of the obtained cavity 77 (that is, the end surface 350 of the waveguide 35) to be almost perpendicular to the element-integration surface 2202.

(Formation of Waveguide and Near-Field Light Element)

FIGS. 10a to 10d and FIGS. 11a to 11c show perspective views for explaining Step SS3 of forming the waveguide 35 and the near-field light generating element 36.

Figure 10A:
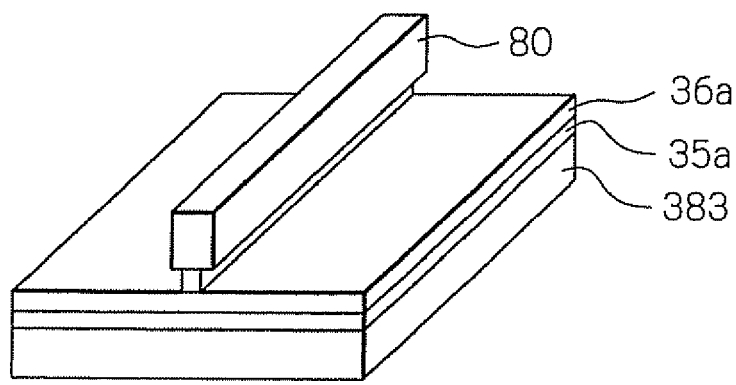
FIGS. 10a to 10d show perspective views for explaining Step SS3 of forming the waveguide and the near-field light generating element.
Figure 10B:
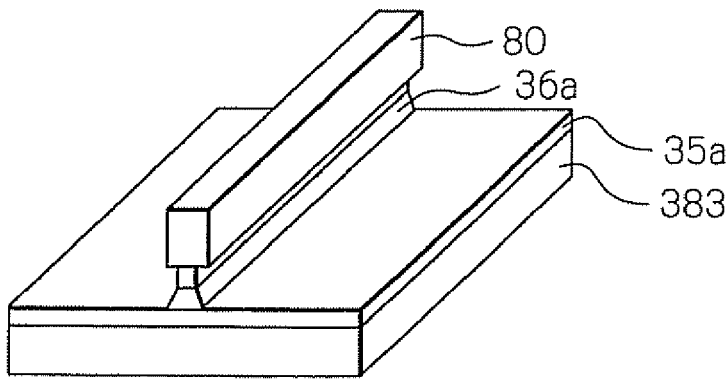
Figure 10C:
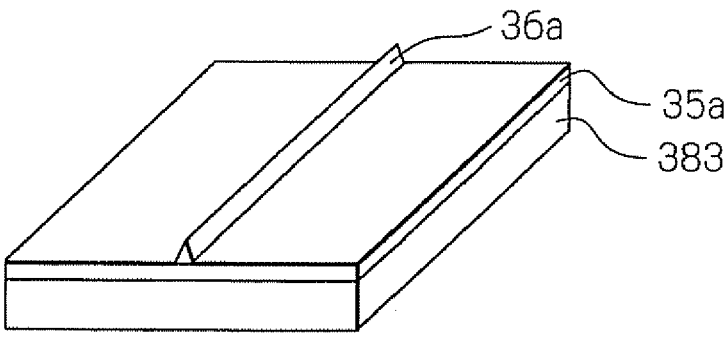

As shown in FIG. 10a, first, on the insulating layer 383, formed is a dielectric material film 35a to be a part of the waveguide, made of a dielectric material such as $Ta_2O_3$ with refractive index higher than the insulating layer 383 made of such as $Al_2O_3$. Next, a metal layer 36a made of such as Au is formed thereon; and then, formed is a resist pattern 80 with its lower portion thinner, on the metal layer 36a. After that, as shown in FIG. 10b, a pattern of metal layer 36a is formed on the dielectric material film 35a, by removing unwanted portion of the metal layer 36a except a portion below the resist pattern 80 with use of, for example, ion milling method. The cross-section of the formed pattern of metal layer 36a has a trapezoidal shape with lower longer edge. Then, as shown in FIG. 10c, formed is the metal layer 36a having a cross-section of triangular shape, by etching a portion of each of both slopes of the trapezoidal metal layer 36a by using ion milling method, after removing the resist pattern 80.

Figure 10D:
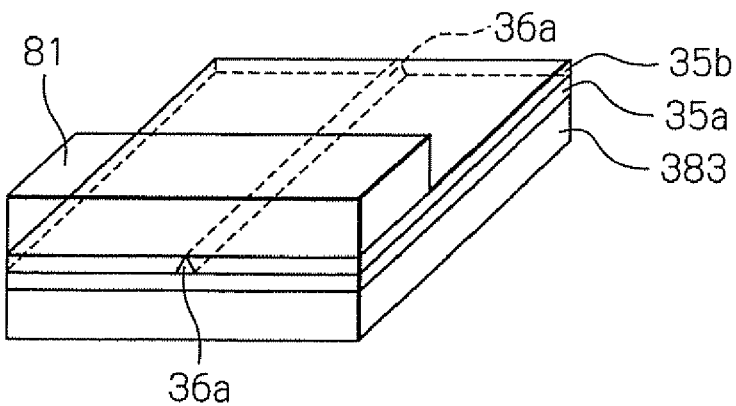
Figure 11A:
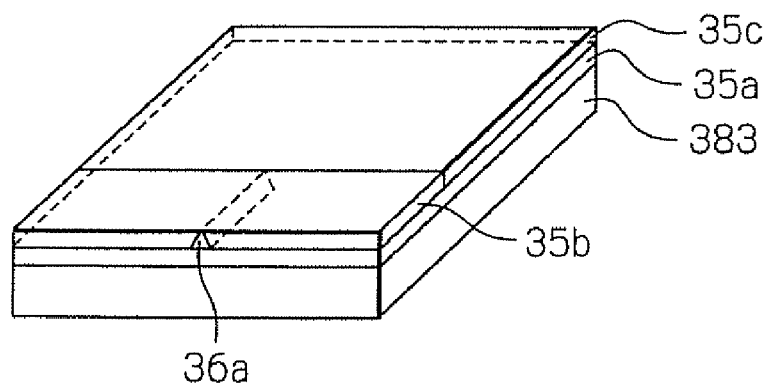
FIGS. 11a to 11c show perspective views for explaining Step SS3 of forming the waveguide and the near-field light generating element.

Next, as shown in FIG. 10d, a dielectric material film 35b made of the same constituent material as the dielectric material film 35a is formed so as to cover the metal layer 36a. Then, a resist pattern 81 for forming the end surface of the metal layer 36a is stacked on the side where the medium-opposed surface is to be formed. After that, as shown in FIG. 11a, portions of the metal layer 36a and dielectric material film 35b are removed by using ion milling method; and then, a dielectric material film 35c made of the same constituent material as the dielectric material film 35b is formed on the removed area.

Figure 11B:
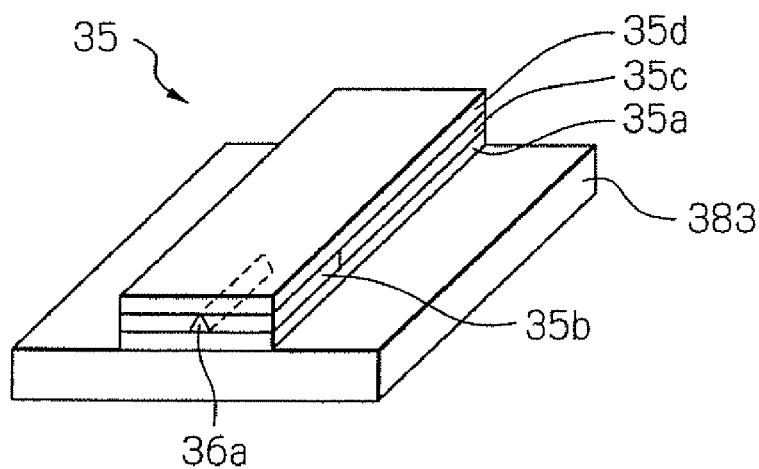

Further, as shown in FIG. 11b, a dielectric material film 35d made of the same constituent material as the dielectric material film 35b is formed on the dielectric material films 35b and 35c. Then, the waveguide 35 is formed by making the dielectric material films 35a, 35b, 35c and 35d a pattern with a predetermined width.

Figure 11C:
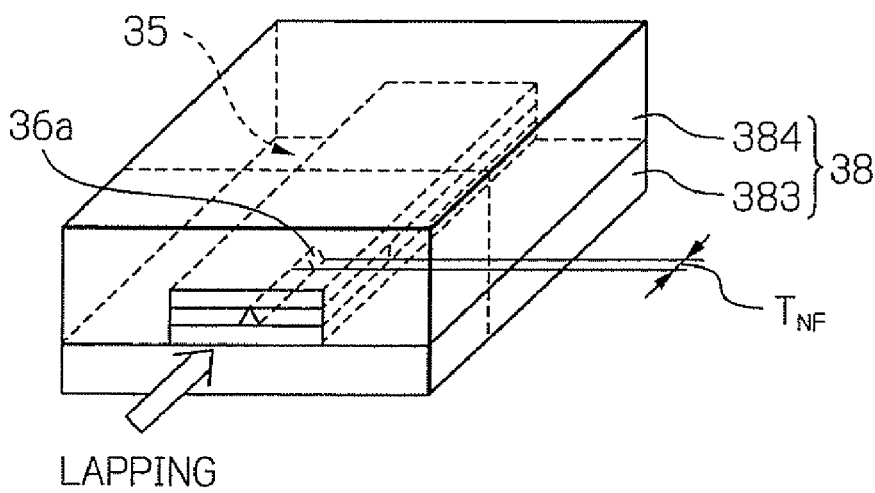

After that, as shown in FIG. 11c, an insulating layer 384 made of the same constituent material as the insulating layer 383 is formed so as to cover the waveguide 35. Thereby, the formation of the insulating layer 38 acting as a clad is completed. Then, by performing Step SS8 (FIG. 6), that is the polishing as a MR height process, completed is the formation of the near-field light generating element 36 having a predetermined width $T_{NF}$.

(Joining of Light Source Unit and Slider)

FIGS. 12a to 12e show schematic views for explaining Step SU3 of fixing the laser diode 40 in the light source unit 23, and Step SH1 to Step SH3 of joining the light source unit 23 to the slider 22.

Figure 12A:
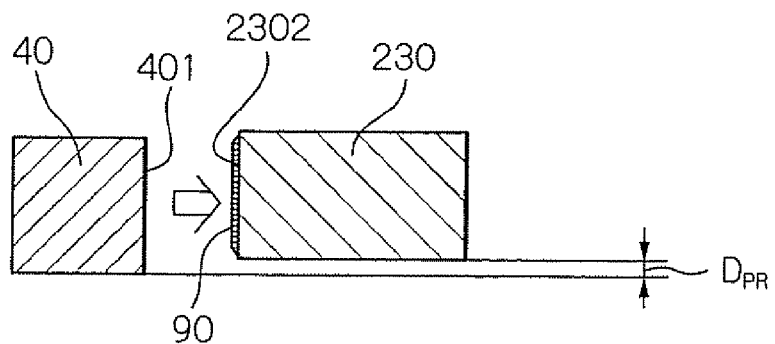
FIGS. 12a to 12e show schematic views for explaining Step SU3 of fixing the laser diode in the light source unit, and Step SH1 to Step SH3 of joining the light source unit to the slider.

First, as shown in FIG. 12a, an evaporation film made of, for example, AuSn alloy 90 with thickness of approximately 0.7 to 1 μm is formed on the source-installation surface 2302 of the unit substrate 230. Next, the laser diode 40 is put on the evaporation film, and then, heated up to about 200 to 300° C. by using, for example, a hot plate and hot-air blower. Thereby, the laser diode 40 is fixed on the unit substrate 230. Here, in this case of soldering with AuSn alloy, the light source unit should be heated up to, for example, 300° C.; however, the present invention manufactures the light source unit 23 independently of the slider 22, which prevents the head elements within the slider 22 from suffering the negative effect of high temperature. When the laser diode 40 is put on the evaporation film 90 of AuSn alloy, a portion 401a of the lower surface 401 of the laser diode 40 is positioned so as to protrude by the amount of protrusion $D_{PR}$ from the unit substrate 230. After that, the terminal electrode 411 is connected to the electrode of the upper surface 403 of the laser diode 40 with a boding wire. Thereby, the manufacturing of the light source unit 23 is completed.

Figure 12B:
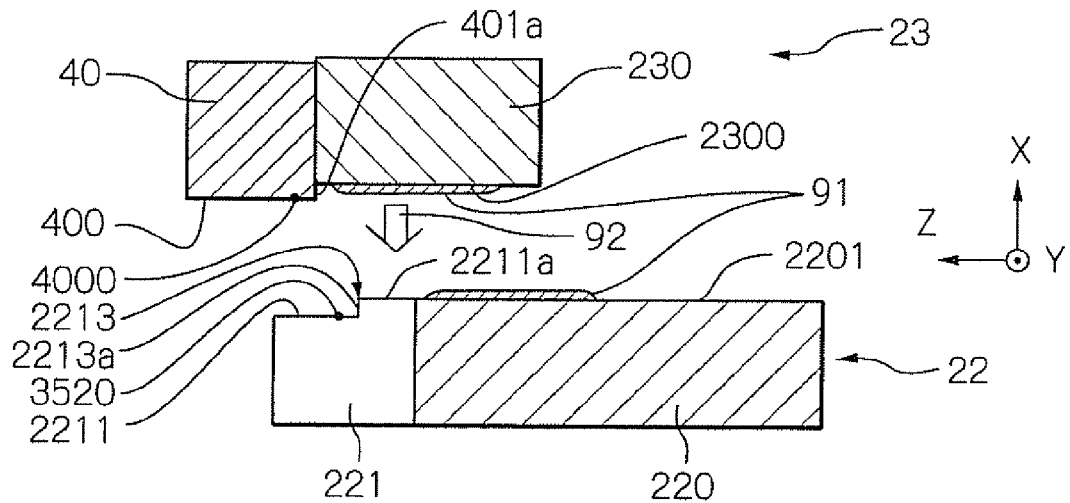
Figure 12C:
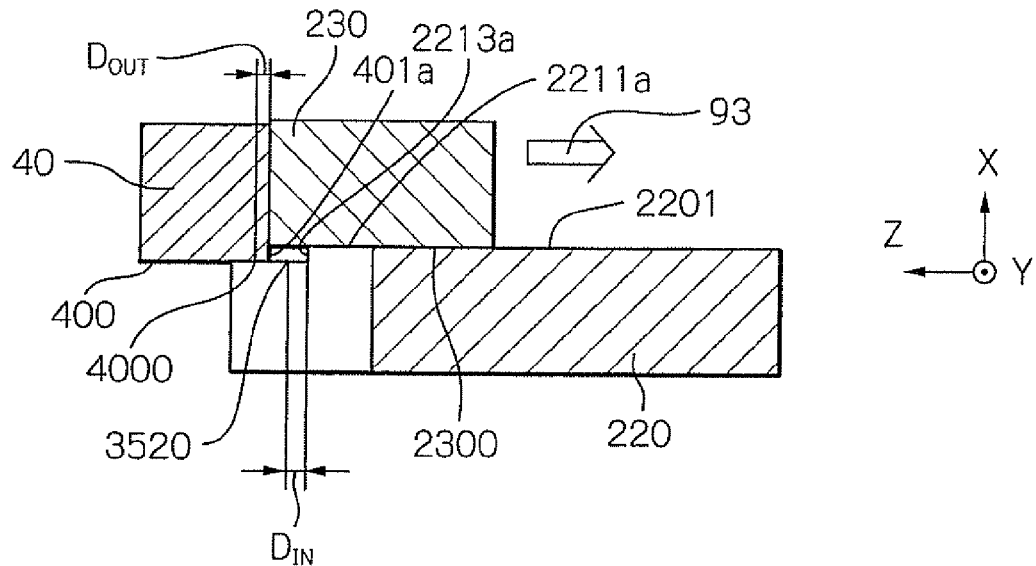

Then, as shown in FIG. 12b, a UV (ultraviolet) cure adhesive 91 is applied, in advance, to the backing surface 2201 of the slider 22 or the joining surface 2300 of the light source unit 23, or to both the surfaces. The UV cure adhesive 91 may be a UV-cure type epoxy resin or a UV-cure type acrylic resin. After that, the light source unit 23 is moved in the direction of arrow 92 (X-axis direction) to the slider 22. Thus as shown in FIG. 12c, the joining surface 2300 of the light source unit 23 is set to have a surface contact with the end surfaces 2211a and 2201 of the slider 22. Further, under keeping the surface contact state, the light source unit 23 is moved in the direction of arrow 93 (Z-axis direction), so that the portion 401a of the lower surface 401 of the laser diode 40 has a surface contact with the wall surface 2213a of the step 2213 of the head part 221.

Here, the distance $D_{OUT}$ between the lower surface 401 of the laser diode 40 and the emission center 4000 is set to be equal to the distance $D_{IN}$ between the upper surface of the stopper layer 42 and the incident center 3520 of the waveguide 35. Therefore, the movement of the light source unit 23 in the direction of arrow 93 (Z-axis direction) enables the positional alignment (the alignment of optical axis) in Z-axis direction to be easily achieved.

Figure 12E:
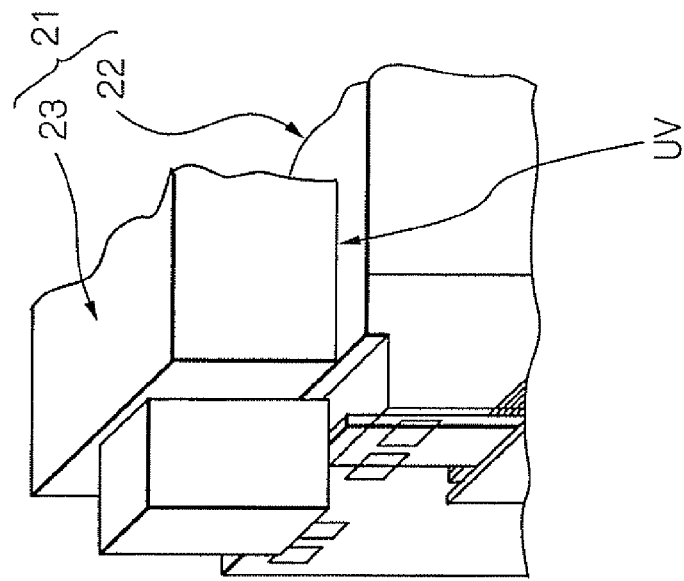
Figure 12D:
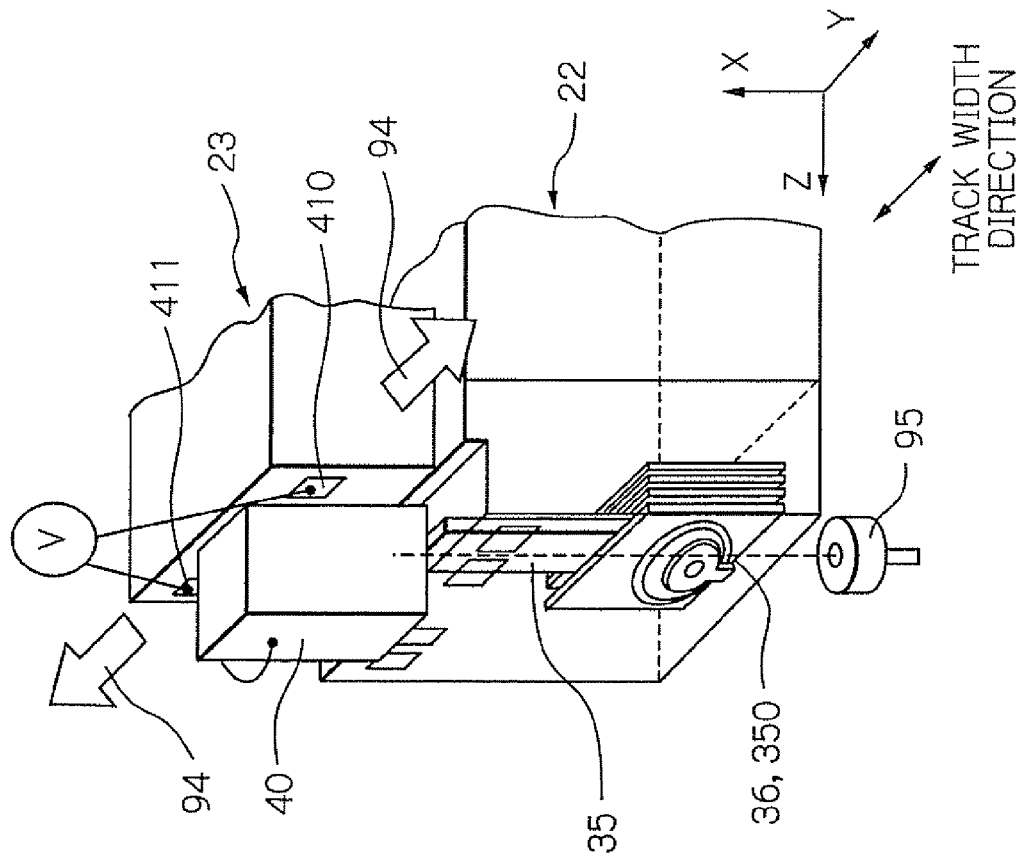

Then, as shown in FIG. 12d, under keeping the state that: the joining surface 2300 of the light source unit 23 has a surface contact with the end surfaces 2211a and 2201 of the slider 22; and the portion 401a of the lower surface 401 of the laser diode 40 has a surface contact with the wall surface 2213a of the step 2213 of the head part 221, the light source unit 23 is moved in either direction (Y-axis direction) of those shown by arrows 94 to align (adjust) the position (the optical axis). During this alignment, laser light is emitted from the laser diode 40 by applying a predetermined voltage between the terminal electrodes 410 and 411 of the laser diode 40; and further, a light detector 95 is provided so as to be opposed to the end surface 350 of the waveguide 35 (to the near-field light generating element 36). Under providing the light detector at the above position during moving the light source unit 23, the light source unit 23 can be set at the fitting position where the light detector 95 shows the maximum output.

Finally, as shown in FIG. 12e, in the state that the light source unit 23 is fixed at its position, ultraviolet (UV) is radiated to adhere the slider 22 and light source unit 23. Thereby, the manufacturing process of the heat-assisted magnetic recording head 21 is completed.

As described above, according to the manufacturing method of the heat-assisted magnetic recording head of the present invention, the light source unit can be joined to the slider with sufficiently high positional accuracy. Especially, because the distances $D_{OUT}$ and $D_{IN}$ can be set to be predetermined values with very small errors by using thin-film processes, the position of the emission center 4000 of the laser diode 40 can be reliably aligned with high accuracy to the position of the incident center 3520 of the waveguide 35. Further, as described above, at least positional alignment in Z-axis direction can be easily completed in a mechanical manner, which excellently facilitates the joining, and thus contributes to the improvement in mass-production efficiency of the heat-assisted magnetic recording head.

All the foregoing embodiments are by way of example of the present invention only and not intended to be limiting, and many widely different alternations and modifications of the present invention may be constructed without departing from the spirit and scope of the present invention. Accordingly, the present invention is limited only as defined in the following claims and equivalents thereto.

The invention claimed is:

1. A slider for heat-assisted magnetic recording, said slider and a light source unit constituting a heat-assisted magnetic recording head, said light source unit being joined to an end surface opposite to a medium-opposed surface of said slider, and said light source unit including: a light source provided on a source-installation surface of a unit substrate; and a surface including an emission center of said light source, and protruded from a joining surface perpendicular to said source-installation surface of said unit substrate, said slider comprising:

a slider substrate; and a head part formed on an element-integration surface perpendicular to the medium-opposed surface of said slider substrate, and including: a write head element for writing data to a magnetic recording medium; and a waveguide having an incident center on its end opposite to the medium-opposed surface, for guiding an entering light to the medium-opposed-surface side, a step being provided on an end surface opposite to the medium-opposed surface of said head part, said step formed so that a portion on the slider-substrate side of the end surface of said head part becomes higher, and a distance between a wall surface of said step and the incident center of said waveguide being set to be equal to a distance between the emission center of said light source and a portion of a lower surface of said light source, said portion being protruded from said unit substrate.

2. The slider as claimed in claim 1, wherein at least a portion of the wall surface of said step is a portion of an upper surface of at least one stopper layer formed above the element-integration surface of said slider substrate, and a distance between said upper surface and the incident center of said waveguide is set to be equal to a distance between the emission center of said light source and a portion of a lower surface of said light source, said portion being protruded from said unit substrate.

3. The slider as claimed in claim 1, wherein the incident center is positioned at a midpoint, in a direction perpendicular to said element-integration surface, of the end of said waveguide opposite to the medium-opposed surface.

4. The slider as claimed in claim 1, wherein a near-field light generating element for generating near-field light used for heat-assist is further provided on an end portion on the medium-opposed surface side of the said waveguide, one end of said near-field light generating element extending to the medium-opposed surface.

5. A light source unit for heat-assisted magnetic recording, said light source unit and a slider constituting a heat-assisted magnetic recording head, said light source unit being joined to said slider, and said slider including: a head part formed on an element-integration surface perpendicular to a medium-opposed surface of a slider substrate; and a step provided on an end surface opposite to a medium-opposed surface of said head part, said step formed so that a portion on the slider-substrate side of the end surface of said head part becomes higher, said light source unit comprising a unit substrate and a light source provided on a source-installation surface of said unit substrate, a surface including an emission center of said light source being protruded from a joining surface perpendicular to said source-installation surface of said unit substrate, and a distance between the emission center of said light source and a portion of a lower surface of said light source, which is protruded from said unit substrate, being set to be a predetermined value.

6. The light source unit as claimed in claim 5, wherein said light source is a laser diode, and the emission center is positioned at a midpoint, in a direction perpendicular to said source-installation surface, of an active layer of said laser diode.

7. The light source unit as claimed in claim 5, wherein said predetermined value is in the range from 2 micrometers to 10 micrometers.

8. A heat-assisted magnetic recording head constituted of a slider and a light source unit, said light source unit being joined to said slider, said light source unit comprising a unit substrate and a light source provided on a source-installation surface of said unit substrate, said slider comprising:

a slider substrate; and a head part formed on an element-integration surface perpendicular to the medium-opposed surface of said slider substrate, and including: a write head element for writing data to a magnetic recording medium; and a waveguide having an incident center on its end opposite to the medium-opposed surface, for guiding an entering light to the medium-opposed-surface side, a surface including an emission center of said light source being protruded from a joining surface perpendicular to said source-installation surface of said unit substrate, a step being provided in an end surface opposite to the medium-opposed surface of said head part, said step formed so that a portion on the slider-substrate side of the end surface of said head part becomes higher, the joining surface of said unit substrate having a surface contact with the portion on the slider-substrate side of the end surface of said head part, and a portion of a lower surface of said light source, which is protruded from said unit substrate, having a surface contact with a wall surface of said step, and a distance between the wall surface of said step and the incident center of said waveguide being set to be equal to a distance between the emission center of said light source and the protruded portion of the lower surface of said light source.

9. The heat-assisted magnetic recording head as claimed in claim 8, wherein at least a portion of the wall surface of said step is a portion of an upper surface of at least one stopper layer formed above the element-integration surface of said slider substrate, and a distance between said upper surface and the incident center of said waveguide is set to be equal to a distance between the emission center of said light source and the portion of the lower surface of said light source, said portion being protruded from said unit substrate.

10. The heat-assisted magnetic recording head as claimed in claim 8, wherein the incident center is positioned at a midpoint, in a direction perpendicular to said element-integration surface, of the end of said waveguide opposite to the medium-opposed surface.

11. The heat-assisted magnetic recording head as claimed in claim 8, wherein a near-field light generating element for generating near-field light used for heat-assist is further provided on an end portion on the medium-opposed surface side of the said waveguide, one end of said near-field light generating element extending to the medium-opposed surface.

12. The heat-assisted magnetic recording head as claimed in claim 8, wherein said light source is a laser diode, and the emission center is positioned at a midpoint, in a direction perpendicular to said source-installation surface, of an active layer of said laser diode.

13. The heat-assisted magnetic recording head as claimed in claim 8, wherein said distance between the emission center of said light source and the portion of the lower surface of said light source, said portion being protruded from said unit substrate, is in the range from 2 micrometers to 10 micrometers.

14. A head gimbal assembly comprising: a suspension; and a heat-assisted magnetic recording head provided on said suspension, constituted of a slider and a light source unit, said light source unit being joined to said slider,
    said light source unit comprising a unit substrate and a light source provided on a source-installation surface of said unit substrate,
    said slider comprising:
    a slider substrate; and
    a head part formed on an element-integration surface perpendicular to the medium-opposed surface of said slider substrate, and including: a write head element for writing data to a magnetic recording medium; and a waveguide having an incident center on its end opposite to the medium-opposed surface, for guiding an entering light to the medium-opposed-surface side,
    a surface including an emission center of said light source being protruded from a joining surface perpendicular to said source-installation surface of said unit substrate,
    a step being provided on an end surface opposite to the medium-opposed surface of said head part, said step formed so that a portion on the slider-substrate side of the end surface of said head part becomes higher,
    the joining surface of said unit substrate having a surface contact with the portion on the slider-substrate side of the end surface of said head part, and a portion of a lower surface of said light source, which is protruded from said unit substrate, having a surface contact with a wall surface of said step,
    a distance between the wall surface of said step and the incident center of said waveguide being set to be equal to a distance between the emission center of said light source and the protruded portion of the lower surface of said light source, and
    an end surface opposite to the medium-opposed surface of said slider substrate being adhered to said suspension; said suspension comprising a aperture; and said light source unit being protruded from said aperture on a side opposite to said slider in relation to said suspension.

15. A magnetic recording apparatus for heat-assisted magnetic recording, comprising:
    at least one head gimbal assembly comprising: a heat-assisted magnetic recording head constituted of a slider and a light source unit, said light source unit being joined to said slider; and a suspension supporting said heat-assisted magnetic recording head,
    at least one magnetic recording medium; and
    a recording circuit for controlling read and write operations of said heat-assisted magnetic recording head, said operations performed to said at least one magnetic recording medium,
    said light source unit comprising a unit substrate and a light source provided on a source-installation surface of said unit substrate,
    said slider comprising:
    a slider substrate; and
    a head part formed on an element-integration surface perpendicular to the medium-opposed surface of said slider substrate, and including: a write head element for writing data to the magnetic recording medium; and a waveguide having an incident center on its end opposite to the medium-opposed surface, for guiding an entering light to the medium-opposed-surface side,
    a surface including an emission center of said light source being protruded from a joining surface perpendicular to said source-installation surface of said unit substrate,
    a step being provided on an end surface opposite to the medium-opposed surface of said head part, said step formed so that a portion on the slider-substrate side of the end surface of said head part becomes higher,
    the joining surface of said unit substrate having a surface contact with the portion on the slider-substrate side of the end surface of said head part, and a portion of a lower surface of said light source, which is protruded from said unit substrate, having a surface contact with a wall surface of said step,
    a distance between the wall surface of said step and the incident center of said waveguide being set to be equal to a distance between the emission center of said light source and the protruded portion of the lower surface of said light source,
    an end surface opposite to the medium-opposed surface of said slider substrate being adhered to said suspension; said suspension comprising a aperture; and said light source unit being protruded from said aperture on a side opposite to said slider in relation to said suspension, and
    said recording circuit further comprising a light-emitting control circuit for controlling light-emitting operation of said light source.

16. A manufacturing method of a heat-assisted magnetic recording head, in which a light source unit is joined to a slider, said light source unit comprising a unit substrate and a light source provided on a source-installation surface of said unit substrate, and said slider comprising:
    a slider substrate; and
    a head part formed on an element-integration surface perpendicular to the medium-opposed surface of said slider substrate, and including: a write head element for writing data to a magnetic recording medium; and a waveguide having an incident center on its end opposite to the medium-opposed surface, for guiding an entering light to the medium-opposed-surface side, said manufacturing method comprising the steps of:

fixing said light source on the source-installation surface of said unit substrate so that a surface including an emission center of said light source is protruded from a joining surface perpendicular to said source-installation surface of said unit substrate;

providing a step on an end surface opposite to the medium-opposed surface of said head part, in which a portion on the slider-substrate side of the end surface of said head part becomes higher, so that a distance between a wall surface of said step and the incident center of said waveguide is set to be equal to a distance between the emission center of said light source and a portion of a lower surface of said light source, said portion protruded from said unit substrate; and while bringing the joining surface of said unit substrate into a surface contact with the portion on the slider-substrate side of the end surface of said head part, bringing the protruded portion of the lower surface of said light source into a surface contact with the wall surface of said step.

17. The manufacturing method as claimed in claim 16, wherein the process of providing said step further comprising the steps of:

forming at least one stopper layer above the element-integration surface of said slider substrate;

forming said waveguide so that a distance between an upper surface of said at least one stopper layer and the incident center of said waveguide is equal to a distance between the emission center of said light source and the protruded portion of the lower surface of said light source; and providing said step in which a portion of the wall surface is a portion of the upper surface of said at least one stopper layer, on an end surface opposite to the medium-opposed surface of said head part, by performing etching process on the end surface of said head part and performing cutting process to obtain individual sliders.

18. The manufacturing method as claimed in claim 17, wherein, after forming said waveguide, at least one additional stopper layer is formed above said waveguide, an end opposite to the medium-opposed surface of at least one additional stopper layer determining a position of the incident center of said waveguide in a direction perpendicular to the medium-opposed surface of said head part; then, said etching process is performed.

19. The manufacturing method as claimed in claim 16, wherein the incident center is set to be positioned at a midpoint, in a direction perpendicular to said element-integration surface, of the end of said waveguide opposite to the medium-opposed surface.

20. The manufacturing method as claimed in claim 16, wherein a laser diode is used as said light source, and the emission center is set to be positioned at a midpoint, in a direction perpendicular to said source-installation surface, of an active layer of said laser diode.

21. The manufacturing method as claimed in claim 16, wherein said distance between the emission center of said light source and the portion of the lower surface of said light source, said portion being protruded from said unit substrate, is set to be in the range from 2 micrometers to 10 micrometers.

* * * * *

UNITED STATES PATENT AND TRADEMARK OFFICE
CERTIFICATE OF CORRECTION

PATENT NO. : 8,243,388 B2  Page 1 of 1
APPLICATION NO. : 12/107216
DATED : August 14, 2012
INVENTOR(S) : Koji Shimazawa et al.

It is certified that error appears in the above-identified patent and that said Letters Patent is hereby corrected as shown below:

Page 1 of the May 7, 2012 Terminal Disclaimer, paragraph 2, line 4 delete "12/785,510"

insert --12/728,510--

Signed and Sealed this
Twenty-sixth Day of March, 2013

Teresa Stanek Rea
*Acting Director of the United States Patent and Trademark Office*